US009971270B2

(12) United States Patent
Hirota et al.

(10) Patent No.: US 9,971,270 B2
(45) Date of Patent: May 15, 2018

(54) IMAGE FORMING APPARATUS

(71) Applicant: CANON KABUSHIKI KAISHA, Tokyo (JP)

(72) Inventors: Kenichi Hirota, Joso (JP); Taichi Takemura, Abiko (JP); Tomohisa Itagaki, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/388,729

(22) Filed: Dec. 22, 2016

(65) Prior Publication Data

US 2017/0102631 A1    Apr. 13, 2017

Related U.S. Application Data

(63) Continuation of application No. 13/989,274, filed as application No. PCT/JP2012/071528 on Aug. 21, 2012, now Pat. No. 9,551,966.

(30) Foreign Application Priority Data

Sep. 6, 2011    (JP) .................................. 2011-194414
Oct. 5, 2011    (JP) .................................. 2011-221233
Oct. 13, 2011   (JP) .................................. 2011-226025

(51) Int. Cl.
    *G03G 15/00*    (2006.01)
    *G03G 15/01*    (2006.01)

(52) U.S. Cl.
    CPC ......... *G03G 15/01* (2013.01); *G03G 15/5062* (2013.01)

(58) Field of Classification Search
    CPC ..... G03G 15/5062; G03G 2215/00063; G03G 2215/00067
    See application file for complete search history.

(56) References Cited

U.S. PATENT DOCUMENTS 6,959,157 B2    10/2005  Nakayama
7,036,737 B2    5/2006   Nakayama et al.
(Continued)

FOREIGN PATENT DOCUMENTS

CN    101261466 A    9/2008
CN    101713942 A    5/2010
(Continued)

OTHER PUBLICATIONS

Office Action issued in Japanese Application No. 2013-273163 dated Jul. 15, 2016.
(Continued)

*Primary Examiner* — Walter L Lindsay, Jr.
*Assistant Examiner* — Jessica L Eley
(74) *Attorney, Agent, or Firm* — Rossi, Kimms & McDowell LLP

(57) ABSTRACT

Temperature of a printing medium 110 is sufficiently decreased by stopping the printing medium 110 in a discharge path, conveying the printing medium at a low speed, switching a conveyance path, or the like. If the temperature of the printing medium 110 can be sufficiently decreased, the thermochromism phenomenon is suppressed. As a result, it is possible to provide an image forming apparatus capable of achieving highly accurate color matching and color stability.

7 Claims, 31 Drawing Sheets

(56) References Cited

U.S. PATENT DOCUMENTS

| | | |
|---|---|---|
| 7,974,568 B2 | 7/2011 | Yamasaki et al. |
| 8,514,451 B2 | 8/2013 | Muto et al. |
| 8,515,331 B2 | 8/2013 | Kurita |
| 8,587,831 B2 | 11/2013 | Muto et al. |
| 2004/0197108 A1 | 10/2004 | Yamagata et al. |
| 2007/0134010 A1 | 6/2007 | Yokoyama |
| 2007/0230978 A1* | 10/2007 | Zaima ............... G03G 15/0131 399/49 |
| 2010/0028029 A1 | 2/2010 | Yokoyama |
| 2010/0086201 A1* | 4/2010 | Muto .................. H04N 1/6033 382/162 |
| 2010/0310287 A1* | 12/2010 | Mikutsu ............ G03G 15/2028 399/322 |
| 2013/0094039 A1 | 4/2013 | Takemura |

FOREIGN PATENT DOCUMENTS

| | | | |
|---|---|---|---|
| JP | 2003098771 A | 4/2003 | |
| JP | 2003114187 A | 4/2003 | |
| JP | 2004086013 A | 3/2004 | |
| JP | 2005283898 A | 10/2005 | |
| JP | 2006350244 A | 12/2006 | |
| JP | 2007230171 A | 9/2007 | |
| JP | 2009037134 A | 2/2009 | |
| JP | 2010088058 A | 4/2010 | |
| WO | 2010038881 A1 | 4/2010 | |

OTHER PUBLICATIONS

Office Action issued in Japanese Application No. 2013-273163 dated Jul. 3, 2015.
International Search Report issued in International Application No. PCT/JP2012/071528 dated Nov. 27, 2012.
Office Action issued in Japanese Application No. 2011-194414 dated Nov. 22, 2012.
Office Action issued in Chinese Application No. 201280019620.9 dated Sep. 15, 2015. English translation provided.
Extended European Search Report issued in European Patent Application No. 12829790.0 dated Oct. 5, 2015.
Office Action issued in U.S. Appl. No. 13/989,274 dated Oct. 10, 2014.
Notice of Allowance issued in U.S. Appl. No. 13/989,274 dated Jun. 16, 2015.
Office Action issued in U.S. Appl. No. 13/989,274 dated Nov. 12, 2015.
Notice of Allowance issued in U.S. Appl. No. 13/989,274 dated Mar. 16, 2016.
Notice of Allowance issued in U.S. Appl. No. 13/989,274 dated Sep. 28, 2016.

* cited by examiner

FIG. 4

Header:

size : 270176 bytes
CMMType : 'appl'
version : 0x02002001
profileClose : 'prtr'
dataColorSpace : 'CMYK'
interchangeSpace : 'XYZ'
CreationDate : 3. 4. 1996, 19:46:14
CS23ignature : 'acsp' prim. platform : 'APPL'
flags : 0x00000000
deviceManufacture : 'EF1'
deviceModel : 0
deviceAttributes : 0x00000000, 0x00000000
renderingIntent : 2
white XYZ : X=0.9642, Y=1.0000, Z=0.8249

Tag Table : <10 elements, double-click to inspect>

| Ind | Signet. | element:offset | size |
|---|---|---|---|
| 0 | 'A2B0' | 252=0x000000FC | 43002 |
| 1 | 'B2A0' | 43256=0x0000A8F8 | 42940 |
| 2 | 'A2B1' | 86196=0x00015084 | 43002 |
| 3 | 'B2A1' | 129200=0x0001F880 | 42940 |
| 4 | 'A2B2' | 172140=0x0002A06C | 43002 |
| 5 | 'B2A2' | 215144=0x00034868 | 42940 |
| 6 | 'gamt' | 258084=0x0003F024 | 11925 |
| 7 | 'desc' | 270012=0x00041EBC | 125 |
| 8 | 'cprt' | 270140=0x00041F3C | 14 |
| 9 | 'wtpt' | 270156=0x00041F4C | 20 |

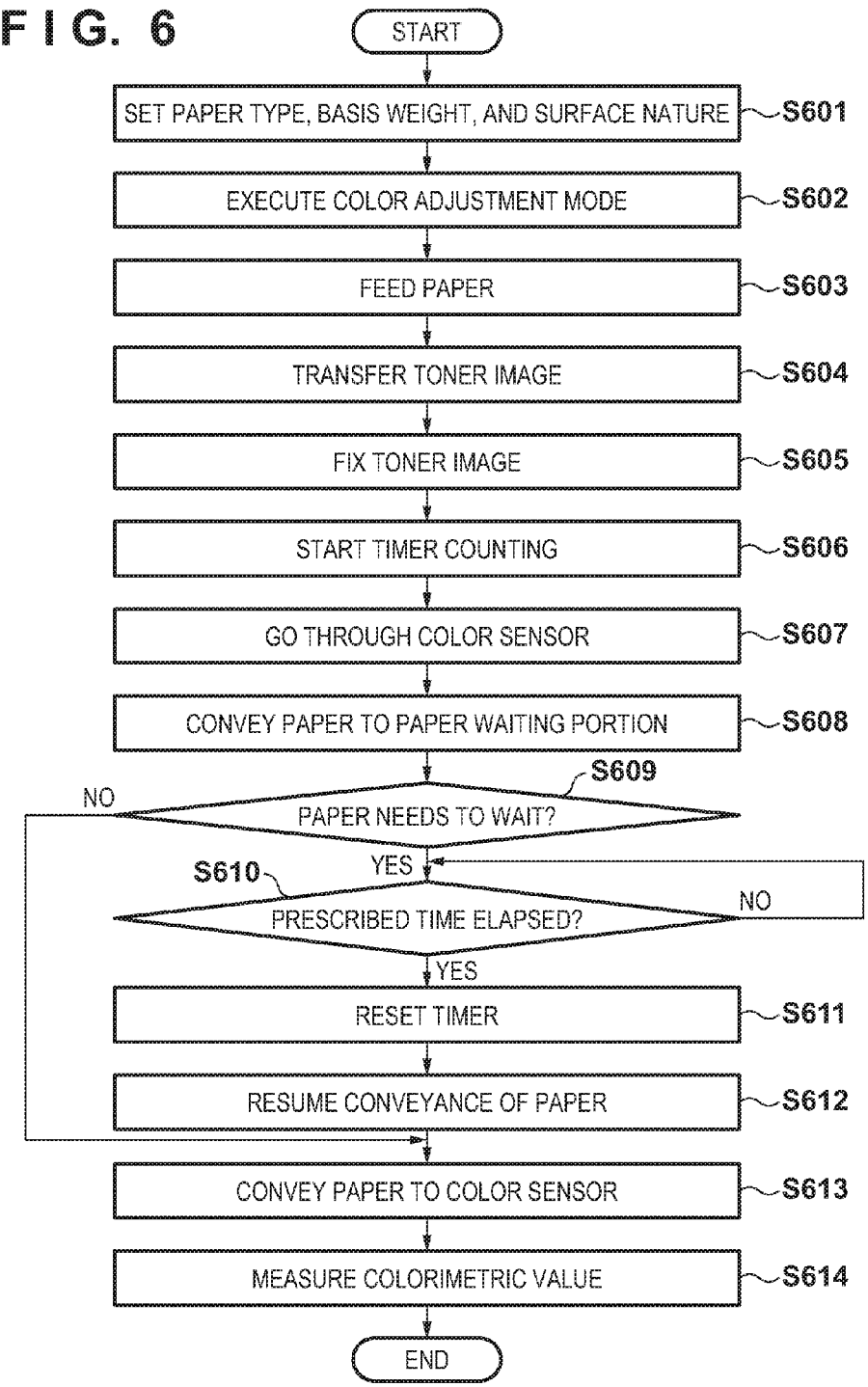

FIG. 10

| BASIS WEIGHT \ SURFACE NATURE | PLAIN PAPER | ONE-SIDE COATED PAPER | TWO-SIDE COATED PAPER |
|---|---|---|---|
| 60gsm~109gsm | 0sec | 20sec | 25sec |
| 110gsm~209gsm | 10sec | 25sec | 30sec |
| 210gsm~350gsm | 35sec | 35sec | 40sec |

F I G. 11A
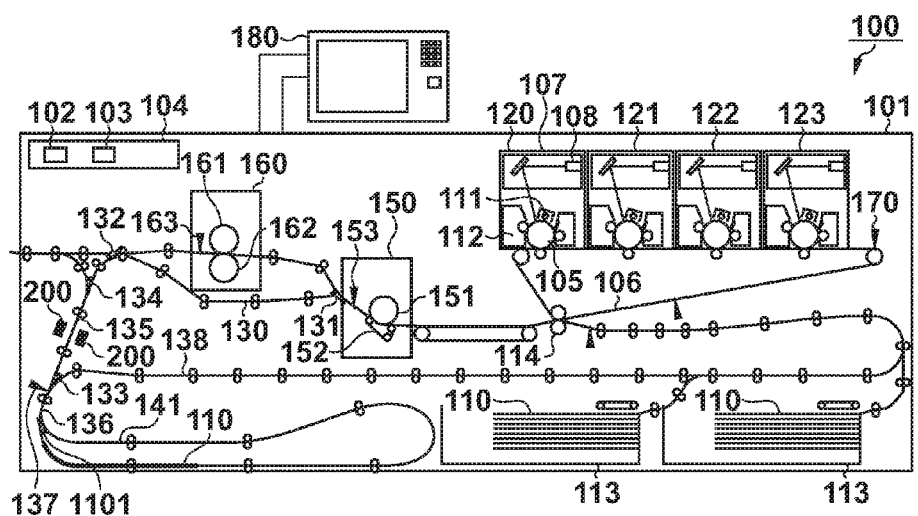
F I G. 11B
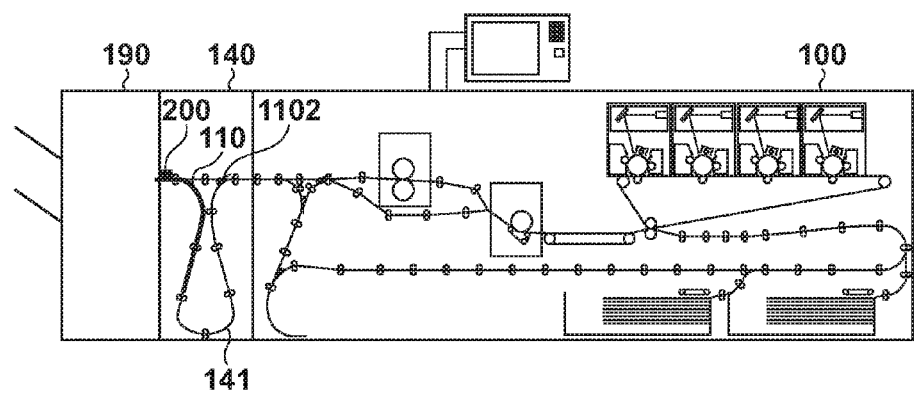

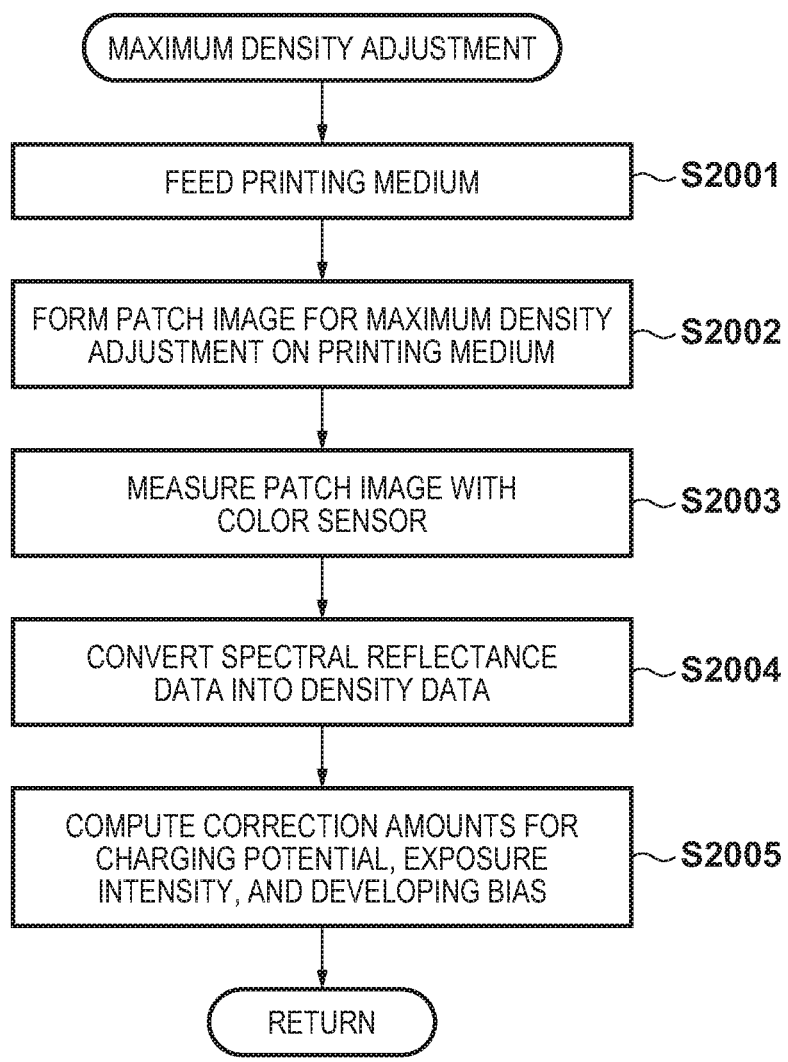
F I G. 20

F I G. 24

| | MAXIMUM DENSITY ADJUSTMENT | TONE ADJUSTMENT | MULTICOLOR CORRECTION PROCESSING | TARGET VALUE COMPUTATION PROCESSING | TOTAL TIME |
|---|---|---|---|---|---|
| PRESENT EMBODIMENT | 35 SECONDS | 45 SECONDS | 40 SECONDS | | 120 SECONDS |
| COMPARATIVE EXAMPLE | 35 SECONDS | 45 SECONDS | 40 SECONDS | 30 SECONDS | 150 SECONDS |

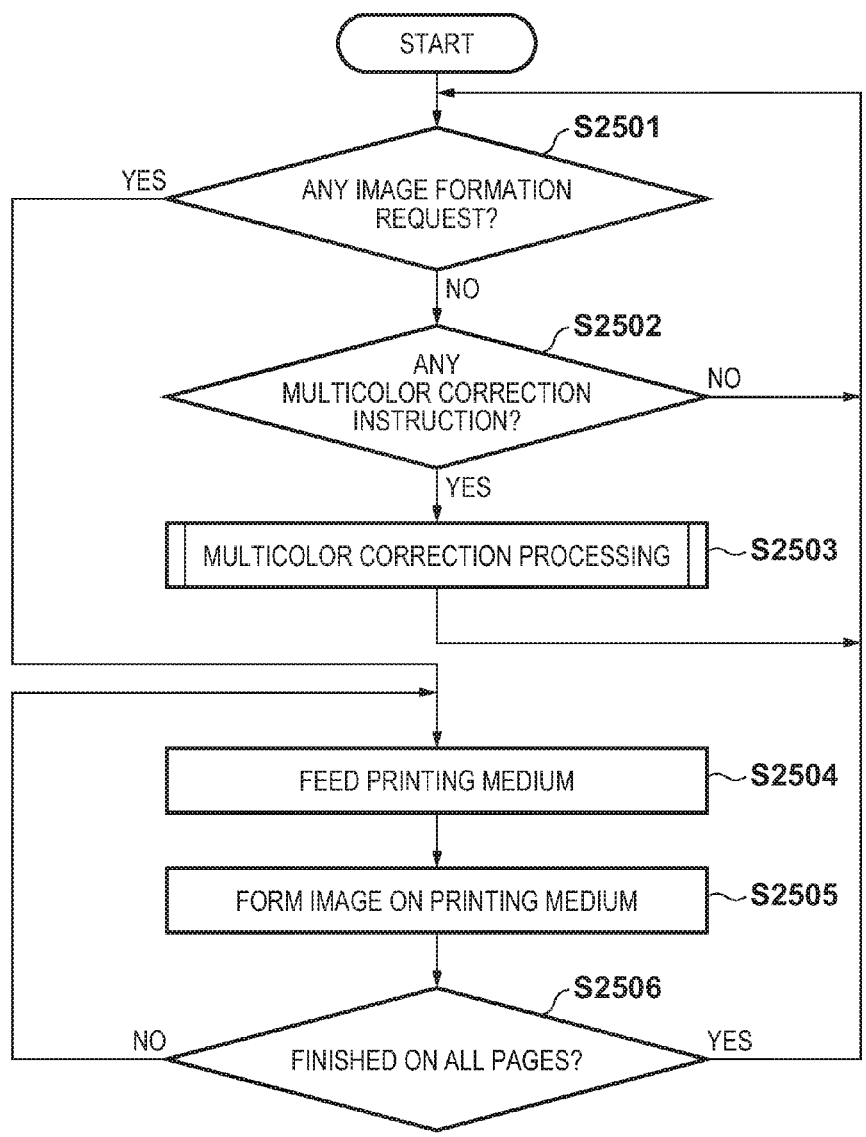
F I G. 25

FIG. 28

| MODE | FIXING CONDITION |
|---|---|
| 1 | FIRST FIXING DEVICE : 140°C |
| 2 | FIRST FIXING DEVICE : 150°C |
| 3 | FIRST FIXING DEVICE : 165°C |
| 4 | FIRST FIXING DEVICE : 180°C |
| 5 | FIRST FIXING DEVICE : 165°C<br>SECOND FIXING DEVICE : 150°C |
| 6 | FIRST FIXING DEVICE : 180°C<br>SECOND FIXING DEVICE : 150°C |
| 7 | FIRST FIXING DEVICE : 180°C<br>SECOND FIXING DEVICE : 180°C |

FIG. 29

| SURFACE NATURE : RECYCLED PAPER | | GLOSSINESS | | |
|---|---|---|---|---|
| | | −1 | STANDARD | +1 |
| BASIS WEIGHT | 56~105 | MODE 1 | MODE 2 | MODE 3 |
| | 106~209 | MODE 2 | MODE 3 | MODE 5 |
| | 210~300 | OUT OF SPECIFICATION | OUT OF SPECIFICATION | OUT OF SPECIFICATION |

FIG. 30

| SURFACE NATURE : FINE QUALITY PAPER | | GLOSSINESS | | |
|---|---|---|---|---|
| | | −1 | STANDARD | +1 |
| BASIS WEIGHT | 56~105 | MODE 2 | MODE 3 | MODE 5 |
| | 106~209 | MODE 3 | MODE 4 | MODE 6 |
| | 210~300 | MODE 4 | MODE 6 | MODE 7 |

FIG. 31

| SURFACE NATURE : COATED PAPER | | GLOSSINESS | | |
|---|---|---|---|---|
| | | −1 | STANDARD | +1 |
| BASIS WEIGHT | 56~105 | OUT OF SPECIFICATION | MODE 5 | MODE 6 |
| | 106~209 | MODE 5 | MODE 6 | MODE 7 |
| | 210~300 | MODE 6 | MODE 7 | OUT OF SPECIFICATION |

FIG. 32

| SURFACE NATURE:<br>RECYCLED PAPER | | GLOSSINESS | | |
|---|---|---|---|---|
| | | −1 | STANDARD | +1 |
| BASIS<br>WEIGHT | 56~105 | 0 SECONDS | 0 SECONDS | 2 SECONDS |
| | 106~209 | 3 SECONDS | 5 SECONDS | 10 SECONDS |
| | 210~300 | OUT OF<br>SPECIFICATION | OUT OF<br>SPECIFICATION | OUT OF<br>SPECIFICATION |

FIG. 33

| SURFACE NATURE:<br>FINE QUALITY PAPER | | GLOSSINESS | | |
|---|---|---|---|---|
| | | −1 | STANDARD | +1 |
| BASIS<br>WEIGHT | 56~105 | 0 SECONDS | 3 SECONDS | 12 SECONDS |
| | 106~209 | 4 SECONDS | 7 SECONDS | 17 SECONDS |
| | 210~300 | 8 SECONDS | 20 SECONDS | 25 SECONDS |

FIG. 34

| SURFACE NATURE:<br>COATED PAPER | | GLOSSINESS | | |
|---|---|---|---|---|
| | | −1 | STANDARD | +1 |
| BASIS<br>WEIGHT | 56~105 | OUT OF<br>SPECIFICATION | 20 SECONDS | 25 SECONDS |
| | 106~209 | 22 SECONDS | 27 SECONDS | 33 SECONDS |
| | 210~300 | 30 SECONDS | 35 SECONDS | OUT OF<br>SPECIFICATION |

IMAGE FORMING APPARATUS

TECHNICAL FIELD

The present invention relates to an image forming apparatus provided with a colorimetric value measuring function.

BACKGROUND ART

Types of image quality in image forming apparatuses include graininess, in-plane homogeneity for image, letter quality, and color reproducibility (including color stability), and the like for one page. Now that multicolor image forming apparatuses are commonly used, it is sometimes said that the most important image quality is color reproducibility. A person has memories of expected colors (especially of human skin, blue sky, metal, etc.) based on experience, and can feel uncomfortable if a color is out of an acceptable range thereof. Such colors are called memory colors, and the reproducibility thereof is considered to be more and more important when a photograph or the like is output. In regard to not only photographed images but also document images, the demand for color reproducibility (including stability) on on-demand image forming apparatuses is growing among users in offices who feel uncomfortable with difference in color from monitors, users in the field of graphic arts who pursue color reproducibility of CG images.

In order to fulfill the users' demand for color reproducibility, Japanese Patent Laid-Open No. 2004-086013 proposes an image forming apparatus for reading a patch image (measurement image) formed on a printing medium with a color sensor provided on a printing medium conveyance path. Compared with an off-line colorimetric value measurer that reads a patch image on a printing medium externally exhausted by an image forming apparatus, the invention disclosed in Japanese Patent Laid-Open No. 2004-086013 has an advantage of its capability of automatically creating an ICC profile. "ICC" is an abbreviation of International Color Consortium. By a color management module (CMM) performing color conversion using the ICC profile, color matching can be achieved among a plurality of image forming apparatuses, or between an image forming apparatus and an image display apparatus.

However, with the invention of Japanese Patent Laid-Open No. 2004-086013, a problem of a phenomenon called "thermochromism", in which chromaticity of a measurement image to be a measurement target object changes due to temperature, is caused because the color sensor is arranged on the conveyance path in the vicinity of a fixing device. It is a phenomenon caused for the reason that a molecular structure that forms a color agent such as toner or ink changes due to "heat", or the like.

To measure a colorimetric value of a measurement image inside an image forming apparatus, the apparatus needs to be in a state after the color agent is put on a printing medium and color mixture is finished. With an image forming apparatus that uses ink as a color agent, it is necessary to measure the colorimetric value after heating and drying the ink with a dryer. With an image forming apparatus that uses toner as a color agent, it is necessary to measure the colorimetric value after mixing colors by heating and melting the toner with a fixing device. This is because a user, who demands for color matching accuracy or color stability, usually makes a judgment based on an image in a normal temperature environment. Accordingly, the color sensor needs to be arranged on a downstream side of the dryer or the fixing device in a sheet conveyance direction.

Meanwhile, to compactly configure an image forming apparatus, a length of a conveyance path from the dryer or the fixing device to the color sensor needs to be a minimum length. Accordingly, the sheet and the color agent heated by the dryer or the fixing device are conveyed to the color sensor without being cooled down to normal temperature. Further, the temperature of a printing medium becomes higher than normal temperature also because of rising temperature of internal components of the image forming apparatus, such as a printing medium conveyance guide, or the internal atmosphere.

As described above, in some cases an image forming apparatus internally provided with a color sensor is due to influence of thermochromism, and obtains a colorimetric value measurement result different from the chromaticity in a normal environment (in a normal temperature environment). There are also the cases where it is impossible to fulfill the color matching accuracy standard, which is an index of the color matching accuracy and color stability, and the reproducibility standard, which is a standard of stability, according to ISO 12647-7.

SUMMARY OF INVENTION

The present invention provides an image forming apparatus capable of suppressing the thermochromism phenomenon in which chromaticity of a measurement image changes due to temperature, and achieving highly accurate color matching and color stability.

The present invention provides an image forming apparatus including: image forming means for forming an image on a printing medium using a color agent; fixing means for fixing the image on the printing medium; colorimetric value measurement means for measuring, downstream of the fixing means in a conveyance direction of the printing medium, a colorimetric value of the image fixed on the printing medium; and control means for setting a time period from when the printing medium passes through the fixing means to when the colorimetric value is measured by the colorimetric value measurement means in a case where colorimetric value measurement is performed by the colorimetric value measurement means to be longer than a time period taken for the printing medium to be conveyed from the fixing means to the colorimetric value measurement means in a case where the colorimetric value measurement is not performed by the colorimetric value measurement means.

According to the present invention, the temperature of a printing medium is sufficiently decreased by stopping the printing medium in a discharge path, conveying the printing medium at a low speed, or switching the conveyance path. If the temperature of the printing medium can be sufficiently decreased, the thermochromism phenomenon is suppressed. As a result, it is possible to provide an image forming apparatus capable of achieving highly accurate color matching and color stability.

Further features of the present invention will become apparent from the following description of exemplary embodiments (with reference to the attached drawings).

BRIEF DESCRIPTION OF DRAWINGS

FIG. 4 is a diagram showing an ICC profile;

FIG. 6 is a flowchart showing Embodiment 1;

FIG. 10 is a diagram showing an example of cooling time period for each type of printing medium;

FIGS. 11A and 11B are diagrams showing a buffer in Embodiment 2;

FIG. 20 is a flowchart showing an operation for maximum density adjustment;

FIG. 24 is a table showing comparison between effects of an embodiment and an example;

FIG. 25 is a flowchart showing an operation of the image forming apparatus;

FIG. 28 is a diagram showing a fixing condition for each mode;

FIG. 29 is a diagram showing modes for combinations of basis weight and glossiness of recycled paper;

FIG. 30 is a diagram showing modes for combinations of basis weight and glossiness of fine quality paper;

FIG. 31 is a diagram showing modes for combinations of basis weight and glossiness of coated paper;

FIG. 32 is a diagram showing modes for combinations of basis weight and glossiness of recycled paper;

FIG. 33 is a diagram showing modes for combinations of basis weight and glossiness of fine quality paper; and FIG. 34 is a diagram showing modes for combinations of basis weight and glossiness of coated paper.

DESCRIPTION OF EMBODIMENTS

Figure 1:
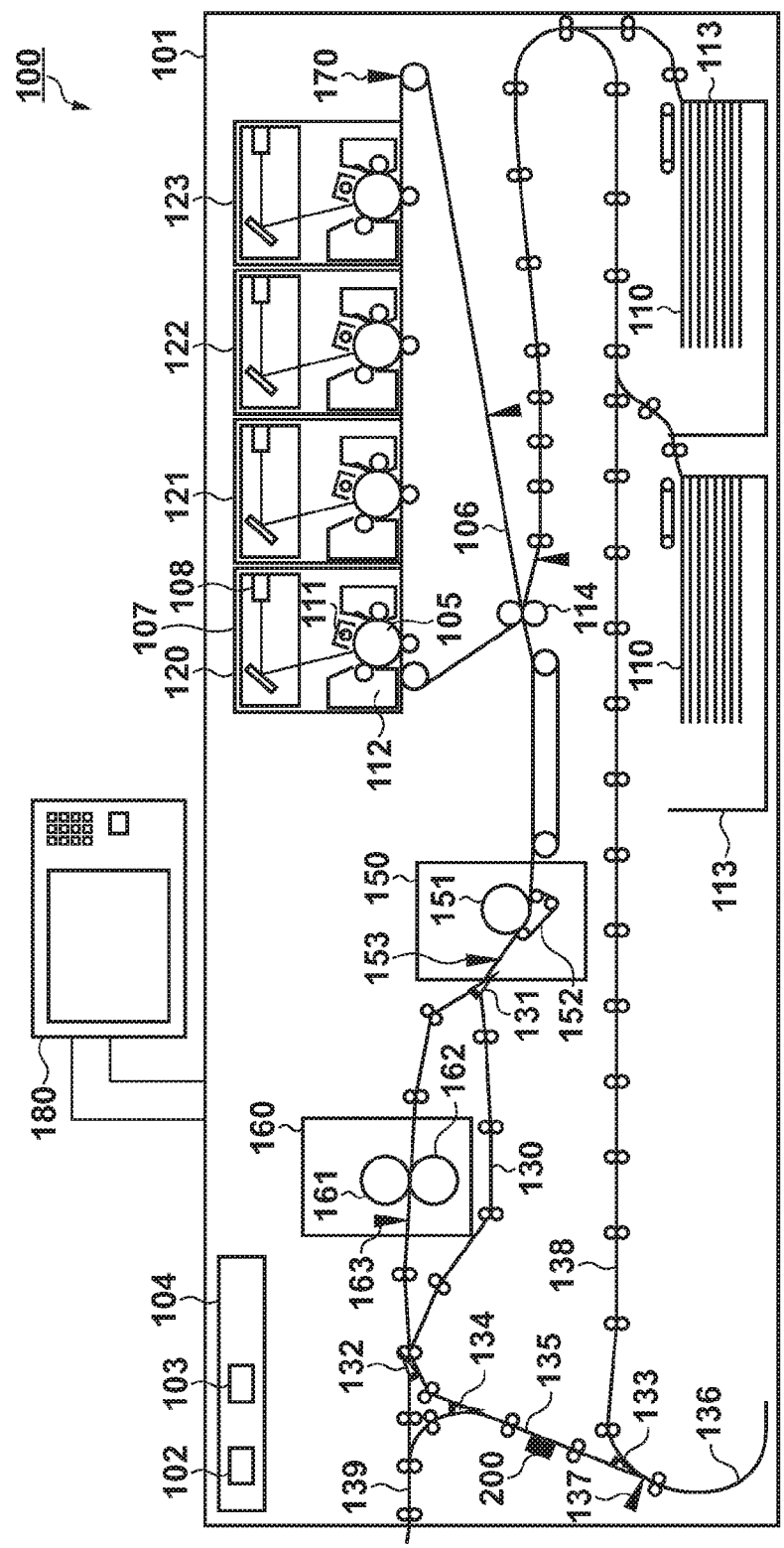
FIG. 1 is a diagram showing an image forming apparatus.

In the present invention, a time period from when a printing medium passes through a fixing unit to when the colorimetric value measurement is performed by a colorimetric value measurement unit in the case where colorimetric value measurement is performed by the colorimetric value measurement unit is set to be longer than a time period taken for the printing medium to be conveyed from the fixing unit to the colorimetric value measurement unit in the case where colorimetric value measurement is not performed by the colorimetric value measurement unit. Particularly, the feature of Embodiment 1 is to control a printing medium conveyance speed in a conveyance path (to temporarily set the conveyance speed to zero). The feature of Embodiment 2 is to set a longer conveyance distance by switching a conveyance path. Note that in Embodiment 2, the conveyance speed may be reduced in a part of the conveyance path when a sufficient conveyance distance cannot be secured even if the conveyance path is switched. Both embodiments have the feature of causing the printing medium to arrive at the colorimetric value measurement unit after a time period elapsed from a time period point when the printing medium passes through the fixing unit exceeds a prescribed time period by controlling the conveyance path or the conveyance speed. Here, the prescribed time period is the time period when a color difference ΔE76 obtained by the colorimetric value measurement unit at the temperature in the environment where the image forming apparatus is installed is 1.5 or smaller. In other words, the prescribed time period is the time period in which the temperature of the printing medium that arrived at the colorimetric value measurement unit decreases to 45° C. or lower. Thus, in the present invention, the temperature of the printing medium is sufficiently decreased by stopping the printing medium in a discharge path, conveying the printing medium at a low speed, or switching the conveyance path. If the temperature of the printing medium can be sufficiently decreased, the thermochromism phenomenon is suppressed. As a result, it is possible to provide an image forming apparatus capable of achieving highly accurate color matching and color stability.

Embodiment 1

Image Forming Apparatus

In the present embodiment, a method for solving the foregoing problem will be described using an electrophotographic laser beam printer. Here, the electrophotographic system is employed as an example of the image forming system. Meanwhile, the present invention can also be applied to the inkjet printer and the sublimation printer. This is because the present invention is effective in image forming apparatuses where a thermochromism phenomenon is possibly caused in which chromaticity of a measurement target object changes due to temperature. Note that in the inkjet printer, an image forming unit for by discharging ink to form an image on a printing medium and a fixing unit (drying unit) for drying the ink are used.

FIG. 1 is a cross-sectional diagram showing a configuration of an image forming apparatus 100. The image forming apparatus 100 has a housing 101. The housing 101 is provided with mechanisms for constituting an engine portion, and a control board containing portion 104. In the control board containing portion 104, an engine control portion 102 for performing control related to printing processes (e.g., paper feed process) performed by the respective mechanisms, and a printer controller 103 are contained.

As shown in FIG. 1, the engine portion is provided with four stations 120, 121, 122 and 123 associated with YMCK, respectively. The stations 120, 121, 122, and 123 are image forming units for transferring toner on a printing medium and forming an image. Here, "YMCK" are abbreviation of yellow, magenta, cyan, and black. Each station is constituted of substantially common components. A photosensitive drum 105 is a kind of image carrier, and is charged by a primary charging device 111 to a uniform surface potential. On the photosensitive drum 105, a latent image is formed by laser light output by a laser 108. A developing device 112 develops the latent image using a color agent (toner) and forms a toner image. The toner image (visible image) is primarily transferred on an intermediate transfer member 106. The visible image formed on the intermediate transfer member 106 is secondarily transferred on a transfer roller 114 with respect to a printing medium 110 conveyed from a container 113.

A fixing process mechanism in the present embodiment has a first fixing device 150 and a second fixing device 160 for heating and pressing the toner image transferred on the printing medium 110 to fix the toner image on the printing medium 110. The first fixing device 150 includes a fixing roller 151 for applying heat to the printing medium 110, a pressing belt 152 for pressing the printing medium 110 to come into contact with the fixing roller 151, and a first post-fixing sensor 153 for detecting completion of fixing. These rollers are hollow rollers, and have a heater inside. The rollers are driven by a motor, which is not shown in the figure, and convey the printing medium 110. The second fixing device 160 is arranged downstream of the first fixing device 150 in the conveyance direction of the printing medium 110. The second fixing device 160 adds gloss to, and maintains fixity of the toner image on the printing medium 110 fixed by the first fixing device 150. Similarly to the first fixing device 150, the second fixing device 160 also has a fixing roller 161, a pressing roller 162, and a second post-fixing sensor 163. Some types of the printing medium 110 do not need to go through the second fixing device 160. In this case, for the purpose of reduction of energy consumption, the printing medium 110 passes through a conveyance path 130 without going through the second fixing device 160. For example, in the case where a setting to add much gloss to an image on the printing medium 110 is configured, or in the case where fixing needs a large heat quantity, such as when the printing medium 110 is thick paper, the printing medium 110 that has gone through the first fixing device 150 is also conveyed to the second fixing device 160. Meanwhile, if the printing medium 110 is plain paper or thin paper, or the setting to add much gloss is not configured, the printing medium 110 is conveyed to the conveyance path 130 that bypasses the second fixing device 160. Whether to convey the printing medium 110 to the second fixing device 160 or convey the printing medium 110 while bypassing the second fixing device 160 is controlled with switching by a switching member 131.

The switching member 132 switches between guiding of the printing medium 110 to a discharge path 135 and guiding to an external discharge path 139. The discharge path 135 is provided with an inversion sensor 137. The leading end of the printing medium 110 passes through the inversion sensor 137, and is conveyed to an inversion portion 136. Upon the inversion sensor 137 detecting the trailing end of the printing medium 110, the conveyance direction of the printing medium 110 is switched. A switching member 133 switches between guiding of the printing medium 110 to a conveyance path 138 for two-sided image formation and guiding to the discharge path 135. A switching member 134 guides the printing medium 110 to an external discharge path 139.

Downstream of the second fixing device 160 in the conveyance direction of the printing medium 110, a color sensor 200 for detecting a measurement image (hereinafter referred to as patch image) on the printing medium 110 are arranged. Four color sensors 200 may be arranged side by side in a direction perpendicular to the conveyance direction of the printing medium 110, and are able to detect four rows of patch image. Thus, a plurality of color sensors 200 can be provided. Upon color detection being instructed by an operating portion 180, the engine control portion 102 performs density adjustment, tone adjustment, multicolor adjustment, and the like.

A density sensor 170, which serves as a density detection unit, is provided opposite to the intermediate transfer member 106. The density sensor 170 is a specular reflection sensor provided with a light-emitting element 171 constituted of a light-emitting diode (LED) and a light-receiving element 172. Although a sensor of specular reflection type is used in the present embodiment, the sensor is not limited thereto, and may alternatively be a sensor of a diffuse reflection type, or a sensor using both the specular reflection type and the diffuse reflection type.

Color Sensor

Figure 2:
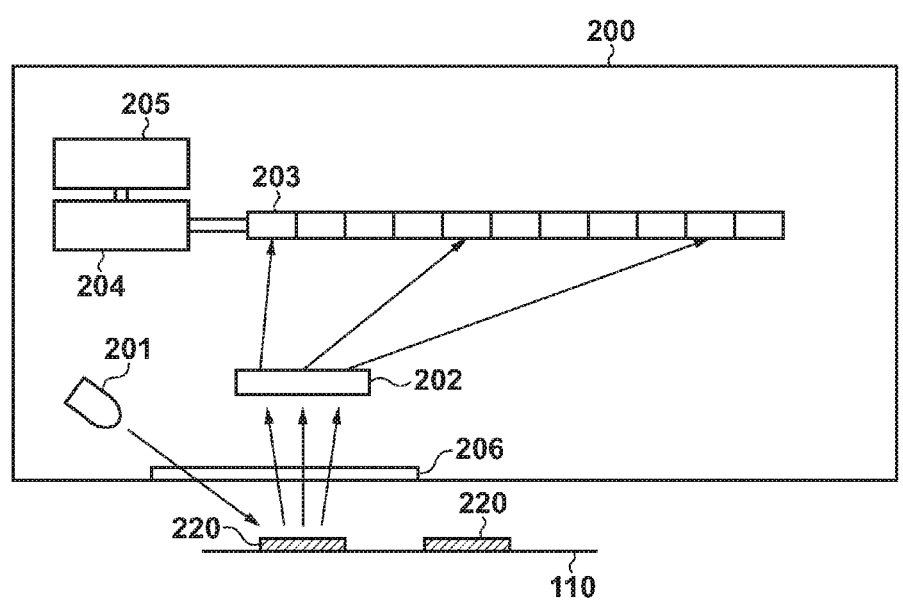
FIG. 2 is a diagram showing a color sensor.

FIG. 2 is a diagram showing a structure of the color sensor 200. The color sensor 200 is internally provided with a white LED 201, a diffraction grating 202, a line sensor 203, a computing portion 204, and a memory 205. The white LED 201 is a light-emitting element for irradiating a patch image 220 on the printing medium 110 with light. The diffraction grating 202 is a spectral component for splitting light reflected by the patch image 220 by wavelength. The line sensor 203 is a light detection element including n light-receiving elements for detecting light split by the diffraction grating 202 by wavelength. The computing portion 204 performs various kinds of computation from a light intensity value of each pixel detected by the line sensor 203. The memory 205 stores various data used by the computing portion 204. The computing portion 204 has, for example, a spectrum computing portion for performing spectrum computation from the light intensity value, a Lab computing portion for computing a Lab value, and the like. A lens 206 may further be provided for condensing light irradiated from the white LED 201 on the patch image 220 on the printing medium 110, and condensing light reflected by the patch image 220 on the diffraction grating 202.

Profile

The image forming apparatus 100 creates a profile from a patch image detection result, and converts an input image using this profile to form an output image. As a profile that achieves excellent color reproducibility, an ICC profile, which has been recently accepted by the market, is used here. However, the present invention is not an invention that can be applied only to the ICC profile. The present invention can also be applied to CRD (Color Rendering Dictionary) proposed by Adobe that has been employed in PostScript level 2 onward, a color separation table in Photoshop, CMYK simulation in EFI's ColorWise for maintaining black print information, and the like.

A user operates the operating portion 180 and instructs color profile creation processing when components are replaced by a customer engineer, before a job that requires color matching accuracy, when a user wants to know colors of a final output in a designing process, or the like.

Figure 3:
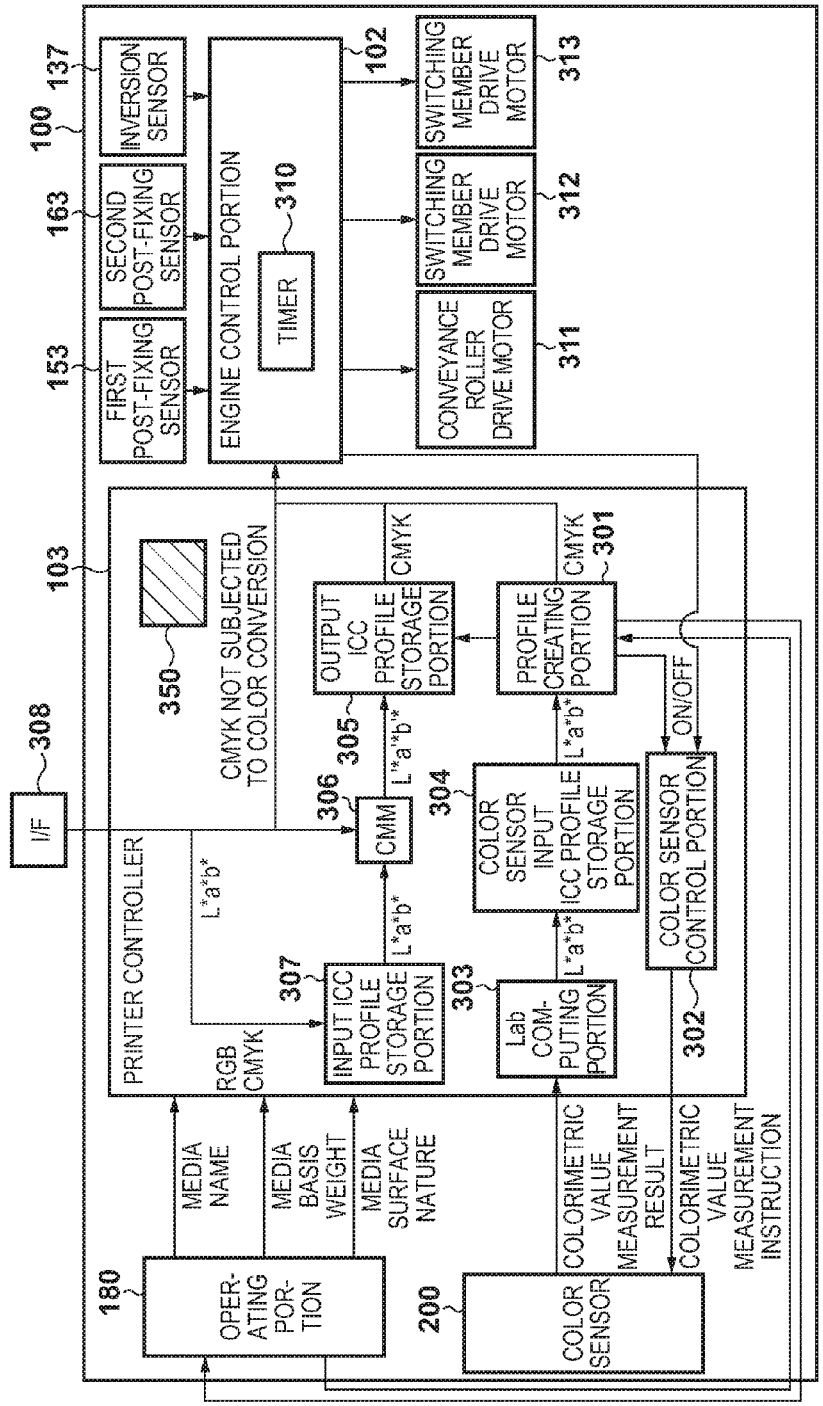
FIG. 3 is a diagram showing a control block.

The profile creation processing is performed by the printer controller 103 shown in the block diagram in FIG. 3. The printer controller 103, which has a CPU, reads out a program for executing a flowchart described later from a storage portion 350 and executes the program. Note that in FIG. 3, the inside of the printer controller 103 is expressed by blocks in order to facilitate understanding of processing performed by the printer controller 103. Upon the operating portion 180 accepting the profile creation instruction, a profile creating portion 301 outputs a CMYK color chart, which is an ISO12642 test form, to the engine control portion 102 without a profile. The profile creating portion 301 transmits a colorimetric value measurement instruction to a color sensor control portion 302. The engine control portion 102 controls the image forming apparatus 100 and causes the image forming apparatus 100 to execute processes such as charging, exposure, development, transfer, and fixing. Thus the ISO12642 test form is formed on the printing medium 110. The color sensor control portion 302 controls the color sensor 200 to cause the color sensor 200 to measure a colorimetric value of the ISO12642 test form. The color sensor 200 outputs spectral reflectance data, which is a colorimetric value measurement result, to a Lab computing portion 303 in the printer controller 103. The Lab computing portion 303 converts the spectral reflectance data into L*a*b* data, and outputs the L*a*b* data to the color sensor input ICC profile storage portion 304. The color sensor input ICC profile storage portion 304 convert the L*a*b* data inputted from the Lab computing portion 303 according to a color sensor input ICC profile, and output the converted L*a*b* data to the profile creating portion 301. Note that the Lab computing portion 303 may convert the spectral reflectance data into a CIE1931XYZ color system, which is a color space signal that does not depend on machines. The color sensor input ICC profile stored in the color sensor input ICC profile storage portion 304 is constituted of a plurality of LUTs (look-up tables). These LUTs are, for example, a one-dimensional LUT for controlling gamma of an input signal, a multicolor LUT called direct mapping, and a one-dimensional LUT for controlling gamma of generated conversion data.

The profile creating portion 301 creates an output ICC profile from based on a relationship between the CMYK color signal output to the engine control portion 102 and the L*a*b* data input by the Lab computing portion 303. The profile creating portion 301 stores the created output ICC profile in place of an output ICC profile stored in an output ICC profile storage portion 305.

The ISO12642 test form contains a patch of a CMYK color signal that covers a color reproducible area that can be output by general copy machines. Accordingly, the profile creating portion 301 creates a color conversion table based on a relationship between color signal values and L*a*b* values obtained by measuring colorimetric values. That is, a CMYK-to-Lab conversion table is created. A reverse conversion table is created based on this conversion table.

FIG. 4 shows a data configuration of the ICC profile. The ICC profile includes a header, tags, and data thereof. The tags include a color conversion table tag, a white point (wtpt), a tag (gamt) for describing whether a color expressed by a Lab value defined inside a profile is in or out of a reproducible range, and the like.

The profile creating portion 301, upon accepting a profile creation command from a host computer via an I/F 308, outputs the created output ICC profile via the I/F 308 to the host computer. The host computer can perform color conversion corresponding to the ICC profile with an application program.

Color Conversion Processing

In the color conversion for a normal color output, an image signal input based on an assumption of an RGB signal input from a scanner portion via the I/F 308, or a standard print CMYK signal value such as JapanColor is transmitted to an input ICC profile storage portion 307 for external input. The input ICC profile storage portion 307 performs RGB-to-L*a*b* or CMYK-to-L*a*b* conversion according to the image signal input from the I/F 308. The input ICC profile stored in the input ICC profile storage portion 307 is constituted of a plurality of LUTs (look-up tables). These LUTs are, for example, a one-dimensional LUT for controlling gamma of an input signal, a multicolor LUT called direct mapping, and a one-dimensional LUT for controlling gamma of generated conversion data. The input image signal is converted from color space that depends on a device into L*a*b* data that does not depend on devices using those LUTs.

The image signal converted into L*a*b* chromaticity coordinates is input to a CMM 306. "CMM" is an abbreviation of color management module. The CMM 306 performs various kinds of color conversion. For example, the CMM 306 performs GUMAT conversion for mapping mismatch between read color space such as a scanner portion serving as an input device and an output color reproducible range of the image forming apparatus 100 serving as an output device. The CMM 306 also performs color conversion for adjusting mismatch between a light source type at the time period of input and a light source type used when an output is observed (also called mismatch in color temperature setting). Thus the CMM 306 converts the L*a*b* data into L'*a'*b'* data and outputs the L'*a'*b'* data to the output ICC profile storage portion 305. The profile created as a result of colorimetric value measurement is stored in the output ICC profile storage portion 305. Accordingly, the output ICC profile storage portion 305 performs color conversion on the L'*a'*b'* data based on the newly created ICC profile to convert it into a CMYK signal that depends on an output device, and outputs the converted CMYK signal to the engine control portion 102.

Figure 5:
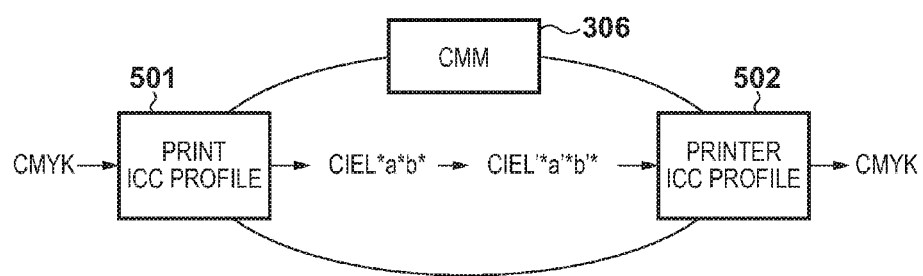
FIG. 5 is a diagram showing a color management environment.

In FIG. 3, the CMM 306 is separated from the input ICC profile storage portion 307 and the output ICC profile storage portion 305. However, as shown in FIG. 5, the CMM 306 refers to a module that governs color management, and performs color conversion using an input profile (print ICC profile 501) and an output profile (printer ICC profile 502).

Control Flow

The control of printing medium conveyance and colorimetric value measurement, which is the feature of the present embodiment, will be described using the flowchart in FIG. 6 and the printing medium position illustration diagram in FIG. 7.

In step S601, the printer controller 103 accepts printing medium information indicating a printing medium type (thickness, grammage (basis weight), surface nature, etc.) via the operating portion 180. If a sensor for detecting the printing medium type is provided in a conveyance path, the printer controller 103 may obtain the printing medium information from this sensor.

In step S602, the printer controller 103 starts a color adjustment mode for performing color adjustment. A start instruction therefor may also be accepted by the operating portion 180.

In step S603, the printer controller 103 instructs the engine control portion 102 to feed the printing medium 110. The engine control portion 102 activates a conveyance roller drive motor 311 and feeds the printing medium 110 from a container 113 to the conveyance path.

In step S604, the printer controller 103 gives an instruction to the engine control portion 102 to control each station and causes the intermediate transfer member 106 to transfer a test form. The printer controller 103 also transmits the printing medium information to the engine control portion 102. The engine control portion 102 secondarily transfers the test form from the intermediate transfer member 106 on the printing medium 110 using a transfer condition according to the printing medium type based on the printing medium information.

In step S605, as a result of the printer controller 103 transmitting the printing medium information to the engine control portion 102, the engine control portion 102 controls the first fixing device 150 and the second fixing device 160 using a fixing condition according to the printing medium type, and fixes the test form on the printing medium 110. The engine control portion 102 controls a switching member drive motor 312 for driving the switching member 131 in accordance with the printing medium type to cause the printing medium 110 to go through only the first fixing device 150, or both the first fixing device 150 and the second fixing device 160. For example, the engine control portion 102 causes the printing medium 110 to go through only the first fixing device 150 in the case of plain paper, and causes the printing medium to go through not only the first fixing device 150 but also the second fixing device 160 in the case of thick paper or coated paper.

In step S606, upon detecting through the engine control portion 102 that the leading end of the printing medium 110 has gone through the first post-fixing sensor 153 or the second post-fixing sensor 163, the printer controller 103 causes a timer 310 in the engine control portion 102 to start to measure time period. Here, in the present embodiment, the time period necessary for decreasing the temperature of the printing medium 110 to an environment temperature is referred to as prescribed time period T. For example, the prescribed time period T is time period when the color difference ΔE76 becomes less than 1.5 after the start of count by the timer 310. In the present embodiment, in consideration of individual difference of the color sensor 200 and repeated reading reproducibility of the same-color patch, a target colorimetric value measurement accuracy value for the color sensor 200 is defined as ΔE76=1.5.

Figure 7A:
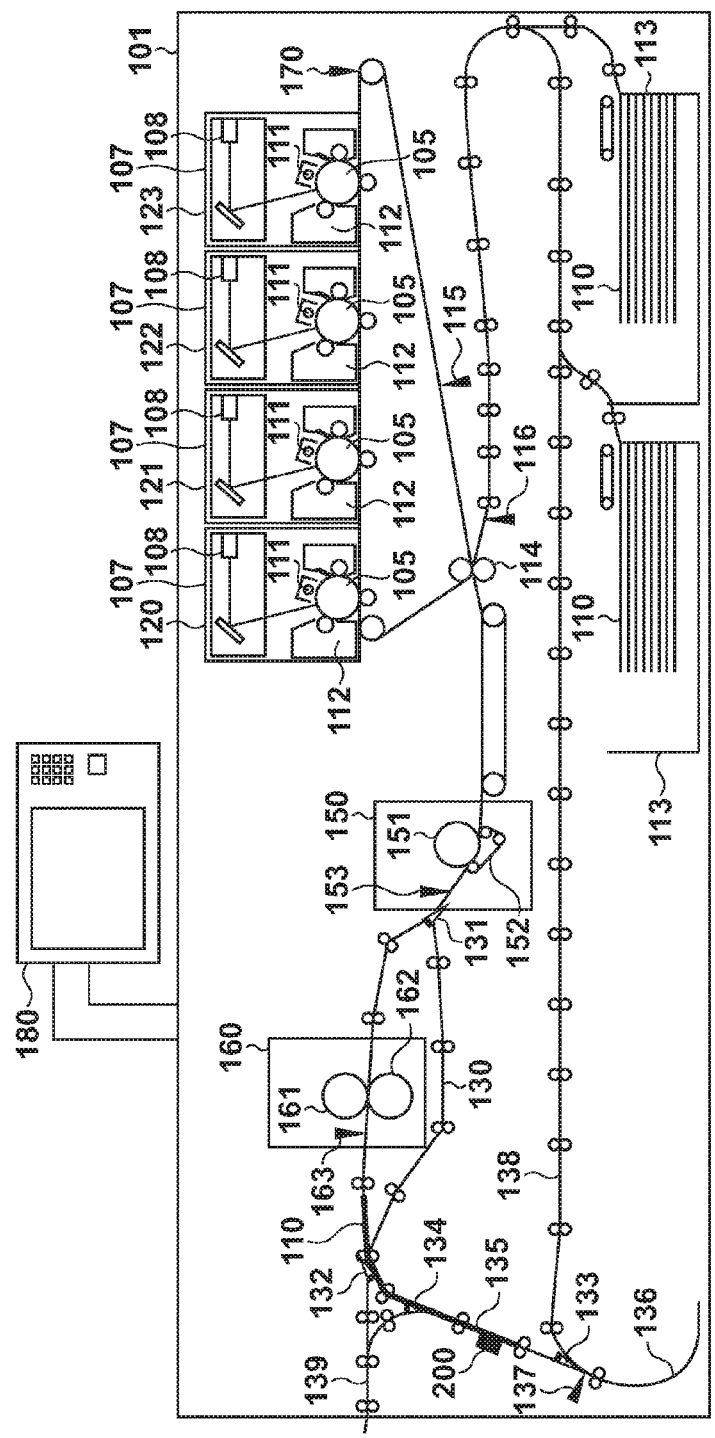
FIGS. 7A to 7C are diagrams showing waiting positions in Embodiment 1.
Figure 7B:
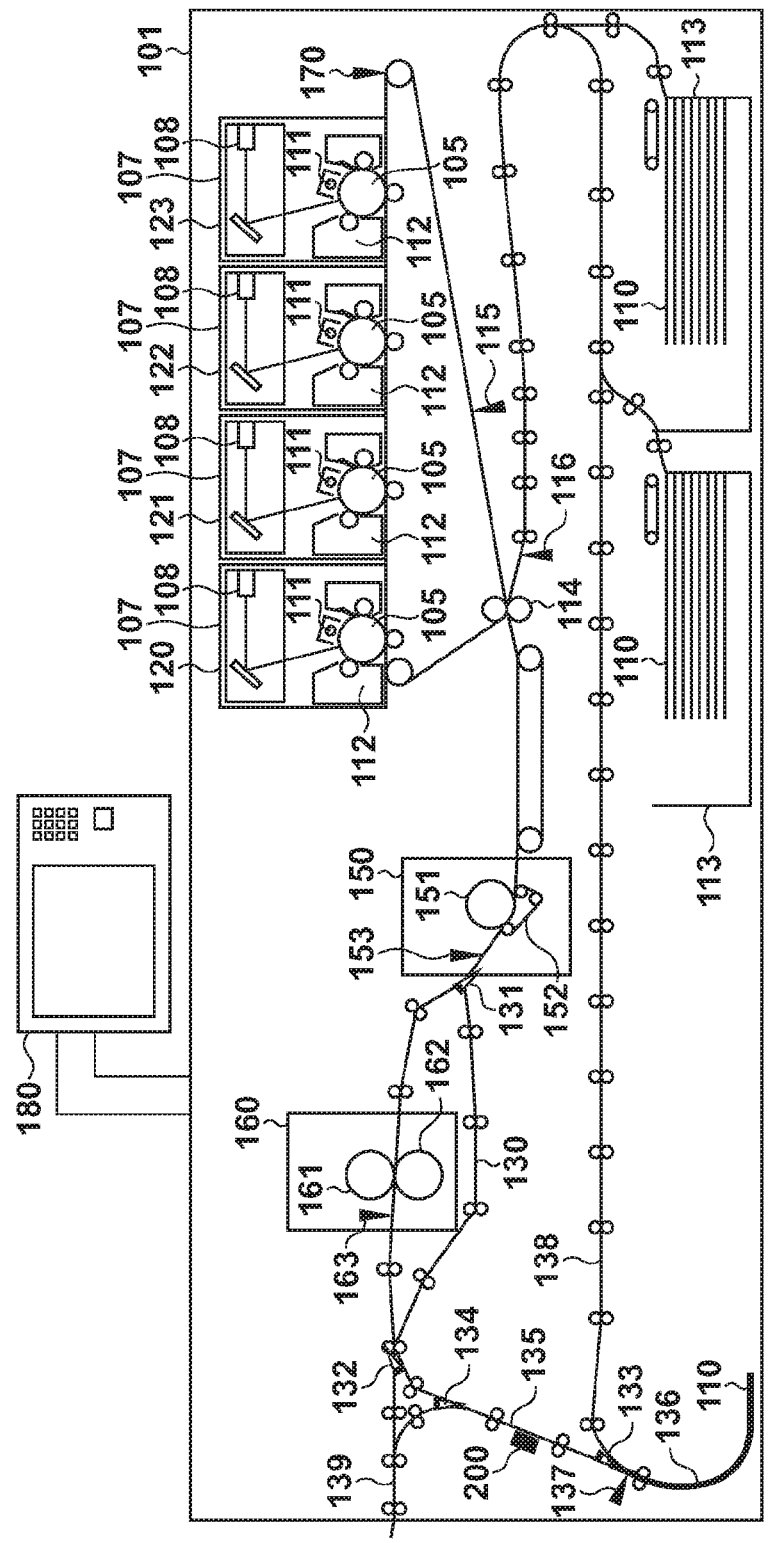
Figure 7C:
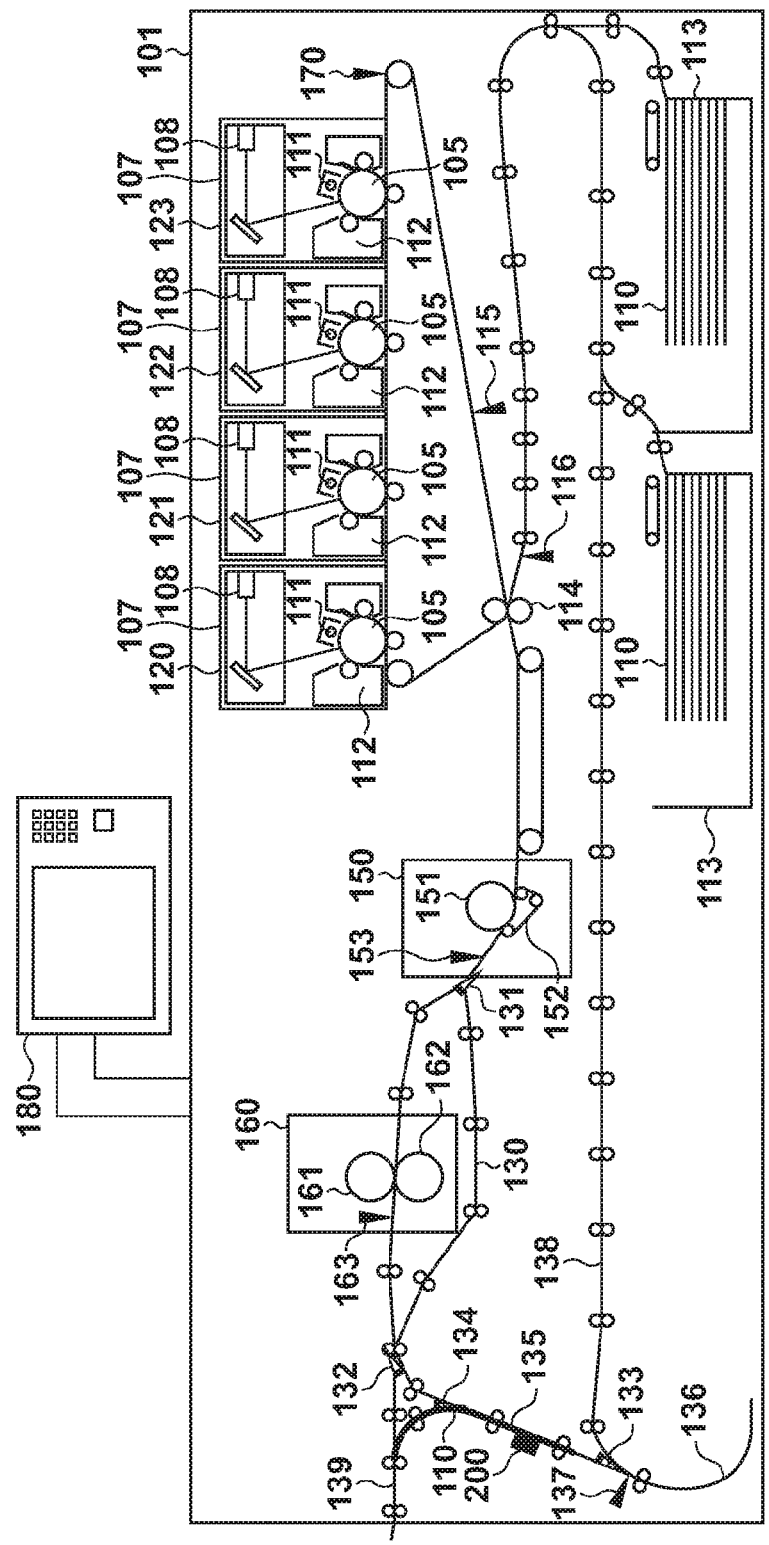

It has been clarified by experiment that chromaticity change of magenta due to temperature is greater than other colors. Particularly, because of the relationship among conveyance time period, printing medium temperature and color difference ΔE of magenta, the prescribed time period T is set to about 45 seconds in the present embodiment. FIGS. 7A to 7C are diagrams showing locations where the printing medium 110 is caused to wait for the prescribed time period T in the image forming apparatus 100.

In step S607, the printer controller 103 causes the engine control portion 102 to continue to convey the printing medium 110, and as a result, the leading end of the printing medium 110 passes through the color sensor 200 as shown in FIG. 7A. Note that the printer controller 103 does not start colorimetric value measurement at this point.

In step S608, the printer controller 103 causes the engine control portion 102 to further continue to convey the printing medium 110. Upon the inversion sensor 137 detecting that the printing medium 110 arrives at the inverting portion 136 as shown in FIG. 7B, the printer controller 103 stops conveyance of the printing medium 110 through the engine control portion 102. That is, the engine control portion 102 stops the conveyance roller drive motor 311. Thus the printing medium 110 waits in the inversion portion 136.

In step S609, the printer controller 103 determines whether or not the type indicated by the printing medium information needs cooling time period. For example, the printer controller 103 holds a table indicating whether or not the cooling time period is necessary with respect to each printing medium information piece. This table is stored in, for example, the storage portion 350. The printer controller 103 determines whether or not the type needs the cooling time period with reference to the table. The determination of the necessity of the cooling time period is substantially the same as determination of whether or not it is necessary to cause the printing medium 110 to wait at the inversion portion 136, and determination of whether or not the conveyance speed of the printing medium 110 needs to be reduced at the inversion portion 136. Accordingly, this table is an example of a table in which different sets of printing medium information are associated with corresponding conveyance paths (whether or not guiding to the inversion portion 136 is necessary) or conveyance speeds (whether or not it is necessary to cause the printing medium to wait at the inversion portion 136). As described above, the printer controller 103 obtains, from the table, the conveyance path or the conveyance speed corresponding to the printing medium information accepted by the operating portion 180, and use the obtained conveyance path or conveyance speed. If the cooling time period is necessary, the processing proceeds to step S610. If the cooling time period is not necessary, the processing skips S610 to S612, and proceeds to step S613.

In step S610, the printer controller 103 obtains a timer value from the timer 310, and determines whether or not the timer value exceeds the prescribed time period T. If the timer value exceeds the prescribed time period T, the processing proceeds to step S611.

In step S611, the printer controller 103 causes the engine control portion 102 to reset the timer 310.

In step S612, the printer controller 103 causes the engine control portion 102 to resume conveyance of the printing medium 110. The engine control portion 102 resumes driving of the conveyance roller drive motor 311, thereby causing the printing medium 110 to go toward the color sensor 200.

In step S613, the printer controller 103 causes the engine control portion 102 to continue to convey the printing medium 110, and as a result, the printing medium 110 passes through the color sensor 200 as shown in FIG. 7C.

According to the present embodiment, the prescribed time period T has already elapsed at the time period point when the printing medium 110 arrives at the color sensor 200. Accordingly, thermochromism-dependent colorimetric value measurement accuracy at this point is ΔE76=0.5 or less. To be more precise, the time period longer than the prescribed time period T has elapsed at this point. This is because the time period taken for the printing medium 110 to arrive at the color sensor 200 has further elapsed since conveyance of the printing medium 110 is resumed in step S612. This time period is a few seconds and does not affect the colorimetric value measurement accuracy.

In step S614, the printer controller 103 causes, through the color sensor control portion 302, the color sensor 200 to measure the colorimetric value. The printing medium 110 after being subjected to colorimetric value measurement by the color sensor 200 goes along the discharge path 139 and is discharged out of the image forming apparatus 100, as shown in FIG. 7C.

Description of Effect

As described above, according to the present embodiment, it is possible to decrease the temperature of the printing medium 110 to a temperature appropriate for colorimetric value measurement by causing the printing medium 110 to wait for the prescribed time period in accordance with the type of the printing medium 110.

Figure 8:
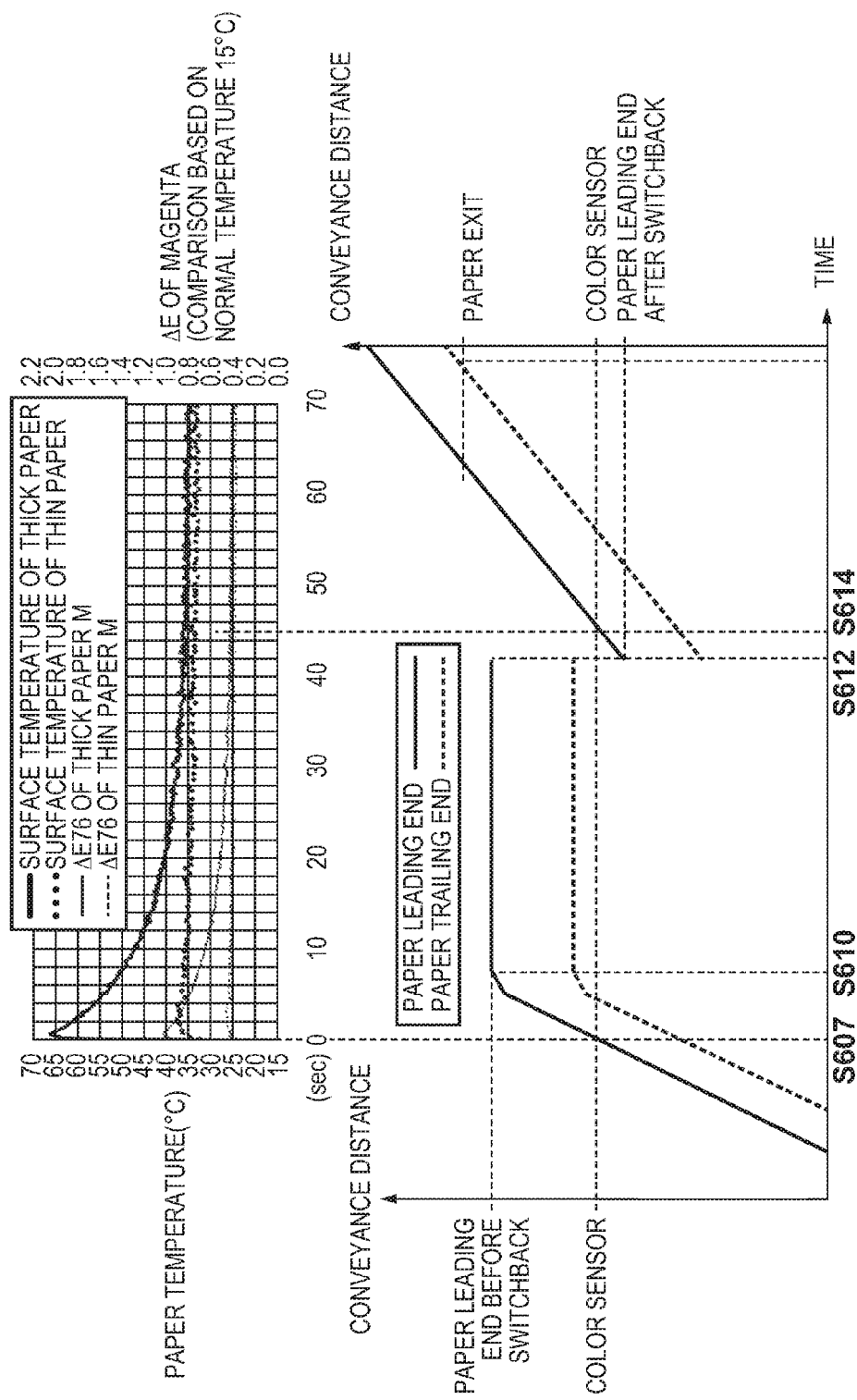
FIG. 8 is a diagram showing a relationship among printing medium waiting time period, printing medium surface temperature, and ΔE76 (comparison based on 15° C.)

FIG. 8 shows a time period-series relationship between the waiting time period, temperature, and ΔE76 (comparison based on 15° C.) of the printing medium 110 and the position of the printing medium 110 in the conveyance path. According to FIG. 8, the temperature of the printing medium 110 is about 65° C. at the point (S607) when the printing medium 110 passes through the color sensor 200 immediately after a toner image is fixed on the printing medium 110. If the colorimetric value measurement is performed at this point, a color difference ΔE76 of about 2.4 occurs with respect to colors in the normal temperature environment (15~30° C.) where the user uses a final product. It means that the color difference ΔE76 exceeds the color reproduction stability standard [4.2.3] (ΔE of each patch being 1.5 or smaller).

In the present embodiment, the printing medium 110 is caused to wait at the inversion portion 136 for the prescribed time period T and is then conveyed again to the color sensor 200, and the colorimetric value measurement is performed. The temperature of the printing medium 110 at this time period is about 45° C. or lower. Accordingly, in the present embodiment, it is possible to reduce the color difference ΔE76 to smaller than 1.5 with respect to the colorimetric value measurement result at 15° C. that is assumed as the lowest temperature in the environment where the image forming apparatus 100 is installed.

Figure 9:
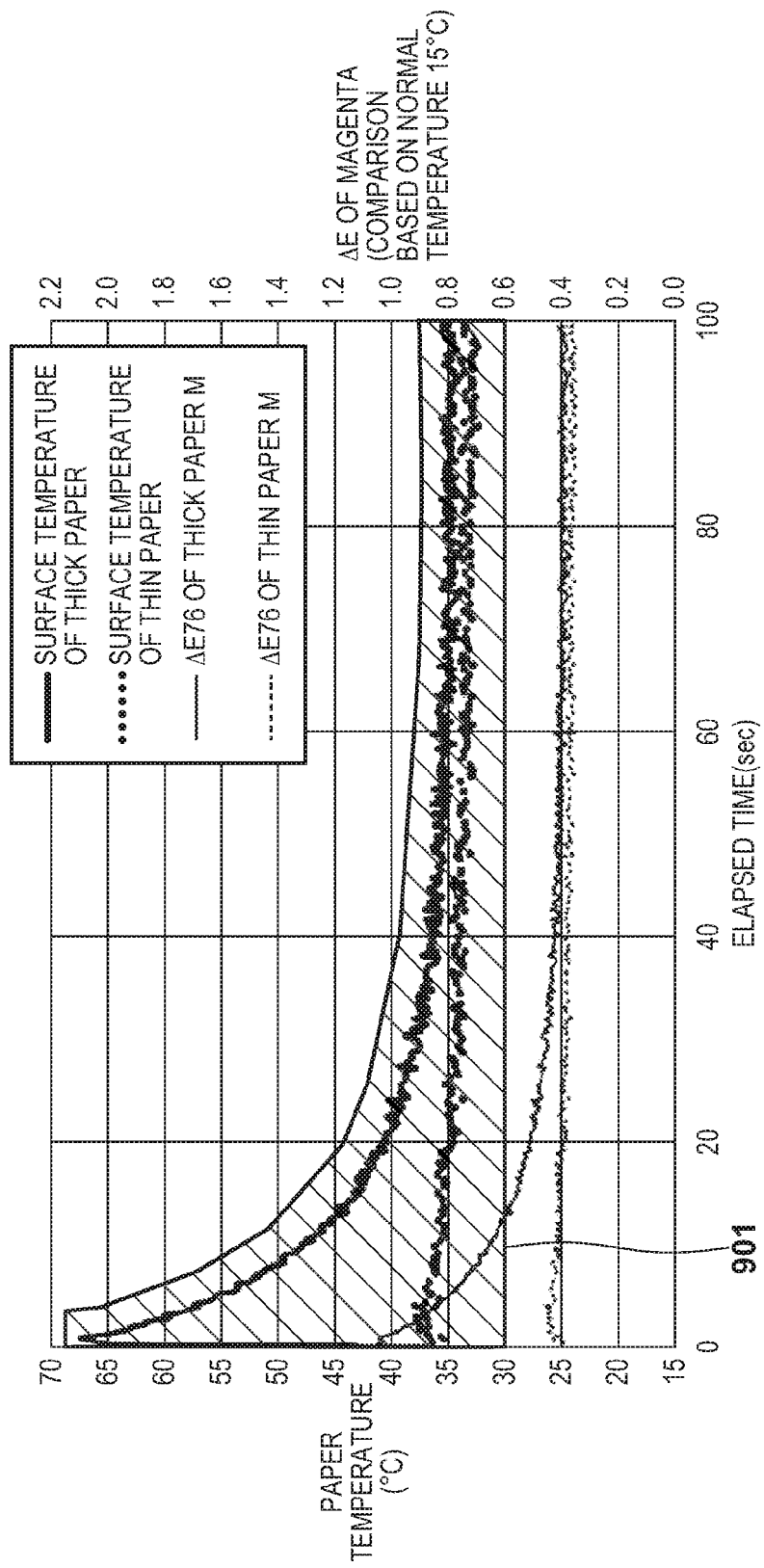
FIG. 9 is a diagram showing a possible range of printing medium temperature in the image forming apparatus.

FIG. 9 shows the possible temperature range of the printing medium 110 in the image forming apparatus 100 by type of the printing medium 110. In FIG. 9, a range 901 with hatching indicates the environment in which operations of the image forming apparatus 100 are guaranteed. In the image forming apparatus 100 in the present embodiment, the temperature of the printing medium 110 immediately after a patch image is fixed on the printing medium 110 is 30° C. to 70° C. Therefore, it can be understood that if it is desired to set the color difference ΔE76 based on the lowest temperature (15° C.) in the installation environment to 0.5 or smaller, the prescribed time period T needs only be set uniformly to 45 sec, regardless of the type of the printing medium 110.

In the present embodiment, the necessity or unnecessity of wait is judged in accordance with the type of the printing medium 110, and the prescribed time period T is determined in accordance with the type of the printing medium 110. Particularly, the time period taken for a colorimetric value measurement sequence can be minimized by dynamically adjusting the prescribed time period T in accordance with the type of the printing medium 110.

Heat capacity of a printing medium is different depending on its basis weight or whether or not it has a surface coating material. With different heat capacity, cooling time period (prescribed time period T) for cooling the printing medium 110 to a target temperature is also different.

FIG. 10 is a table showing the relationship between the prescribed time period T, which is the cooling time period, and the types of the printing medium 110. According to FIG. 10, three types of surface nature, namely plain paper, one-side coated paper, and two-side coated paper are given as examples. As for the basis weight, three types, namely 60 gsm to 109 gsm, 110 gsm to 209 gsm, and 210 gsm to 350 gsm are given. Particularly, the prescribed time period T can be set to 0 only for plain paper (thin paper) having no surface coating layer. Further, with the table shown in FIG. 10, the printer controller 103 can set the prescribed time period T to the minimum time period in accordance with the type of the printing medium 110. That is, it is possible to shorten the time period for the entire colorimetric value measurement sequence by dynamically controlling the prescribed time period T. In this case, the table is stored in advance in the storage portion 350.

As described above, according to the present embodiment, the time period from when the printing medium 110 passes through the fixing unit to when colorimetric value measurement is performed by the color sensor 200 in the case where colorimetric value measurement is performed by the color sensor 200 is set to be longer than the time period taken for the printing medium 110 to be conveyed from the fixing unit to the color sensor 200 in the case where the colorimetric value measurement is not performed by the color sensor 200, and thus, the colorimetric value measurement is performed in a state where the temperature of the printing medium 110 is sufficiently decreased. Accordingly, even with different thickness, basis weight, or surface nature of the printing medium 110, the result of colorimetric value measurement by the color sensor 200 can be stabilized. As a result, it is possible to achieve ΔE76<1.5.

Embodiment 2

The feature of the present embodiment lies in that the colorimetric value measurement is performed by the color sensor 200 after the prescribed time period T without using the timer 310 in the engine control portion 102 in the image forming apparatus 100. Specifically, the present embodiment would be effective in image forming apparatuses that have no waiting position where the printing medium 110 is caused to wait.

Image Forming Apparatus

The configuration of the image forming apparatus according to the present embodiment will be hereinafter described. FIG. 11A shows an example in which a buffer portion 141 is provided inside the image forming apparatus 100, and FIG. 11B shows an example in which the buffer portion 141 is provided outside the image forming apparatus 100.

In FIG. 11A, the buffer portion 141 is arranged on the downstream side of the inversion portion 136 in the conveyance direction of the printing medium 110. The engine control portion 102 switches between use and non-use of the buffer portion 141 with a switching member 1101. The conveyance speed at the buffer portion 141 is set to be lower than the conveyance speed in the conveyance paths other than in the buffer portion 141 so that the printing medium 110 arrives at the color sensor 200 after the temperature of the printing medium 110 is sufficiently decreased. Note that instead of the conveyance speed, the conveyance distance in the buffer portion 141 may be designed to be long enough to sufficiently decrease the temperature of the printing medium 110.

In FIG. 11B, a buffer unit 140 is connected on the downstream side in the image forming apparatus 100. The engine control portion 102 switches between use and non-use of the buffer portion 141 with a switching member 1102. The conveyance speed at the buffer portion 141 is set to be lower than the conveyance speed in the conveyance paths other than in the buffer portion 141 so that the printing medium 110 arrives at the color sensor 200 after the temperature of the printing medium 110 is sufficiently decreased. A post-process unit 190 or the like can be connected downstream of the buffer unit 140 in the conveyance direction of the printing medium 110. The post-process unit 190 is a unit for executing a punching process, a bookbinding process, a stapling process, and the like. Such a buffer unit 140 has an advantage of being able to be added to existing image forming apparatuses.

The discharge path that does not go through the buffer portion 141 is a first conveyance path to which the printing medium 110 is guided in the case where the colorimetric value measurement is not performed by the colorimetric value measurement unit. The discharge path that passes through the buffer portion 141 is a second conveyance path to which the printing medium 110 is guided in the case where the colorimetric value measurement is performed by the colorimetric value measurement unit. As is clear from FIGS. 11A and 11B, the conveyance distance of the second conveyance path is longer than that of the first conveyance path. In the case where the colorimetric value measurement is not performed, the printer controller 103 controls a conveyance roller, which is a conveyance unit, to convey the printing medium 110 at a first conveyance speed. In the case where the colorimetric value measurement is performed, the printer controller 103 controls the conveyance roller so as to temporarily stop the printing medium, or conveys the printing medium at a second conveyance speed that is slower than the first conveyance speed. The case of temporarily stopping the printing medium is an example of reducing the second conveyance speed to zero, and the technical ideal thereof is common to that of Embodiment 1.

Note that in FIG. 11A, the front and back sides of the printing medium 110 are inverted after it passes through the buffer portion 141, and therefore the color sensor 200 needs to be arranged on the opposite side to that in FIG. 1. Further, to also measure the colorimetric value of the printing medium 110 that does not need to go through the buffer portion 141, another color sensor 200 needs to be arranged at the same position as in FIG. 1. That is, two color sensors 200 are necessary. Of course a single color sensor 200 will do if the engine control portion 102 executes conveyance control so that the printing medium 110 that does not need to go through the buffer portion 141 is also caused to go through the buffer portion 141.

As described above, in the case where the buffer portion 141 cannot be installed inside the housing 101 because of the body size of the image forming apparatus 100, the buffer unit 140 shown in FIG. 11B would be useful. Note that because the point that the colorimetric value measurement is performed after a lapse of the prescribed time period T is common to FIGS. 11A and 11B, basically the colorimetric value measurement sequence is also common.

Figure 12:
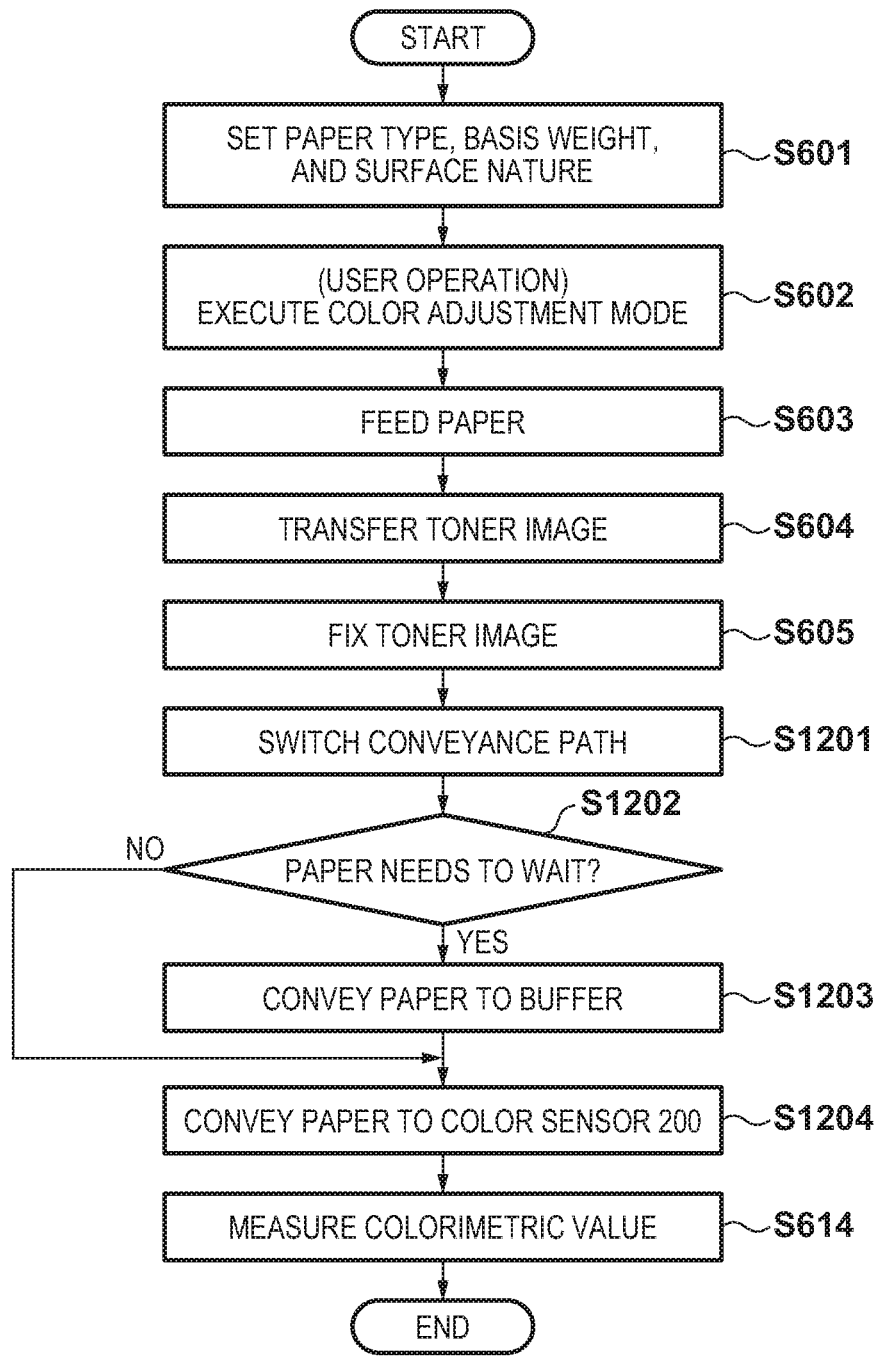
FIG. 12 is a flowchart showing Embodiment 2.

In the flowchart in FIG. 12, the same steps as those in the flowchart in FIG. 6 are assigned the same reference numerals, and the description thereof will be omitted. In FIG. 12, after steps S601 to S605 are executed, the processing proceeds to step S1201. In step S1201, the printer controller 103 drives the switching member drive motor 313 through the engine control portion 102 to cause the switching member 132 to switch the conveyance path, and guides the printing medium 110 to the discharge path 135.

In step S1202, the printer controller 103 determines whether or not the type indicated by the printing medium information needs the cooling time period. The method for this determination is the same as in step S610. For example, the printer controller 103 determines whether or not the type needs the cooling time period with reference to a table stored in the storage portion 350. The determination of whether or not the type needs the cooling time period is substantially the same as determination of whether or not guiding to the buffer portion 141 is necessary, and determination of whether or not the conveyance speed of the printing medium needs to be reduced at the buffer portion 141. Accordingly, this table is an example of a table in which different sets of printing medium information are associated with corresponding conveyance paths (whether or not guiding to the buffer portion 141 is necessary) or the conveyance speeds (whether or not the conveyance speed of the printing medium needs to be reduced at the buffer portion 141). As described above, the printer controller 103 obtains, from the table, the conveyance path or the conveyance speed corresponding to the printing medium information accepted by the operating portion 180, and use the obtained conveyance path or conveyance speed. If the cooling time period is necessary, the processing proceeds to step S1203. If the cooling time period is not necessary, the processing proceeds to step S1204, and the printer controller 103 conveys the printing medium 110 to the color sensor 200.

In step S1203, the printer controller 103 causes, through the engine control portion 102, the switching member 1101 to switch the conveyance path, and guides the printing medium 110 to the buffer portion 141. Further, the printer controller 103 activates, through the engine control portion 102, the conveyance roller drive motor 311 for driving the conveyance roller arranged in the buffer portion 141, and conveys the printing medium 110 through the conveyance path in the buffer portion 141. Note that the engine control portion 102 drives the conveyance roller drive motor 311 so that the conveyance speed of the printing medium 110 in the buffer portion 141 is slower than the conveyance speed in the other conveyance paths such as the discharge path 135. Thus the prescribed time period T is consumed, and the temperature of the printing medium 110 can be sufficiently decreased. Note that in an image forming apparatus in which a sufficient length of the conveyance path in the buffer portion 141 can be secured, the conveyance speed does not need to be reduced.

In step S1204, the printer controller 103 conveys the printing medium 110 that has returned to the discharge path 135 further to the color sensor 200. After that, the processing proceeds to step S614, and the colorimetric value measurement is performed.

Description of Effect

Figure 13:
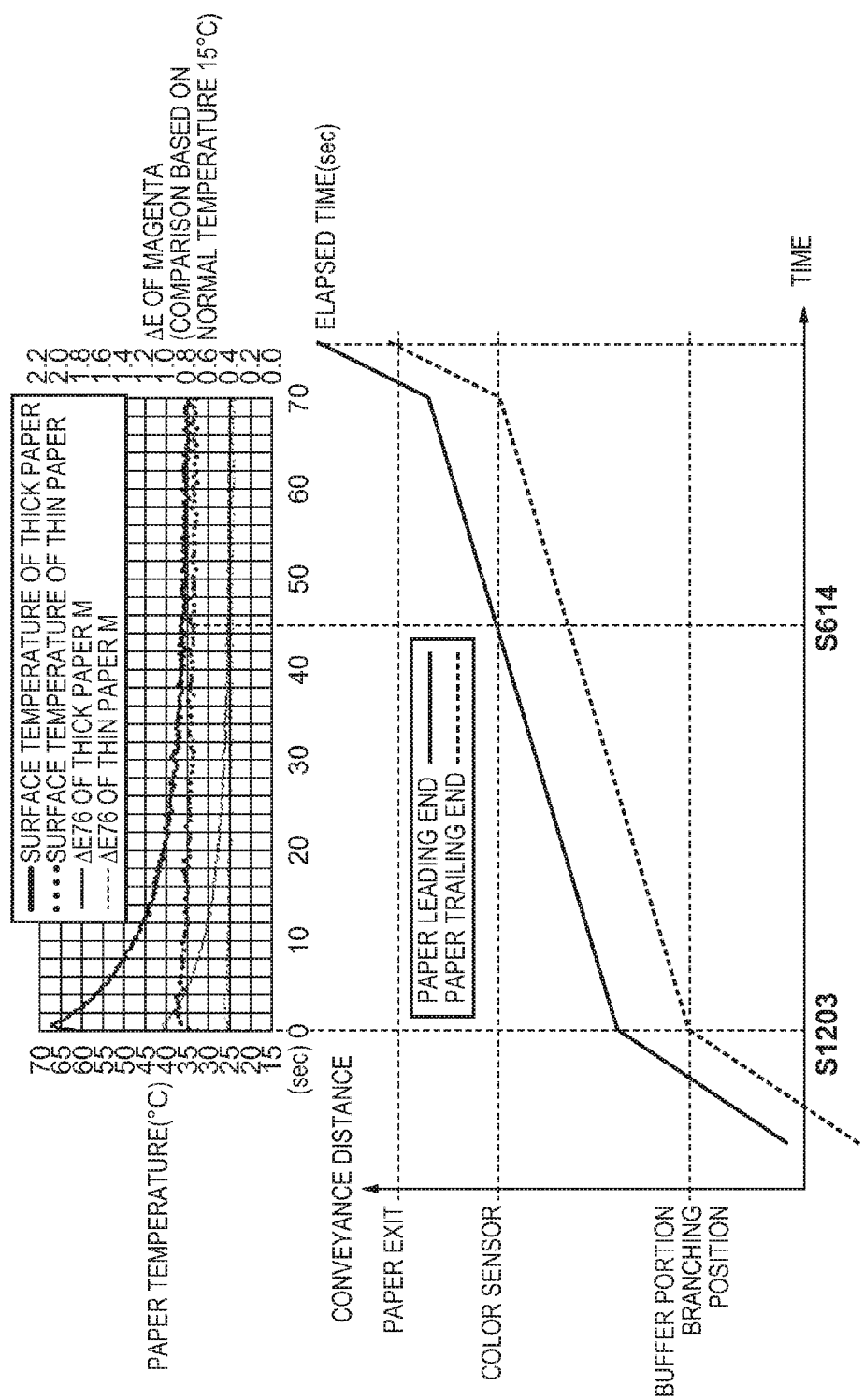
FIG. 13 is a diagram showing a relationship among printing medium waiting time period, paper surface temperature, and ΔE76 (comparison based on 15° C.)

FIG. 13 is a diagram showing, in time period series, the printing medium waiting time period, printing medium temperature, ΔE76 (comparison based on 15° C.), and printing medium position (conveyance distance). At the point when the trailing end of the printing medium 110 passes through the switching member 1101, the engine control portion 102 slows the conveyance speed in the buffer portion 141 (S1203). Thus the printing medium 110 passes through the color sensor 200 after a lapse of the prescribed time period T after the printing medium 110 departs the fixing device.

In Embodiment 2, similarly to Embodiment 1, the temperature of the printing medium 110 is about 65° C. at the point when the printing medium 110 first passes through the color sensor 200. If the colorimetric value measurement is performed at this point, a color difference ΔE76 of about 1.7 occurs with respect to colors in the normal temperature environment (25° C.) where the user uses a final product. This value exceeds the color reproduction stability standard [4.2.3] (ΔE of each patch being 1.5 or smaller).

Meanwhile, in the present embodiment, the printing medium 110 can be caused to arrive at the color sensor 200 after a lapse of the prescribed time period T, that is, after the temperature of the printing medium 110 is decreased to 45° C. or lower, by guiding the printing medium 110 to the buffer portion 141. Accordingly, the color difference ΔE76 with respect to colors at the expected lowest temperature (15° C.)

in the environment where the image forming apparatus 100 is installed can be reduced to 1.5.

Third Embodiment

Maximum Density Adjustment

Figure 14:
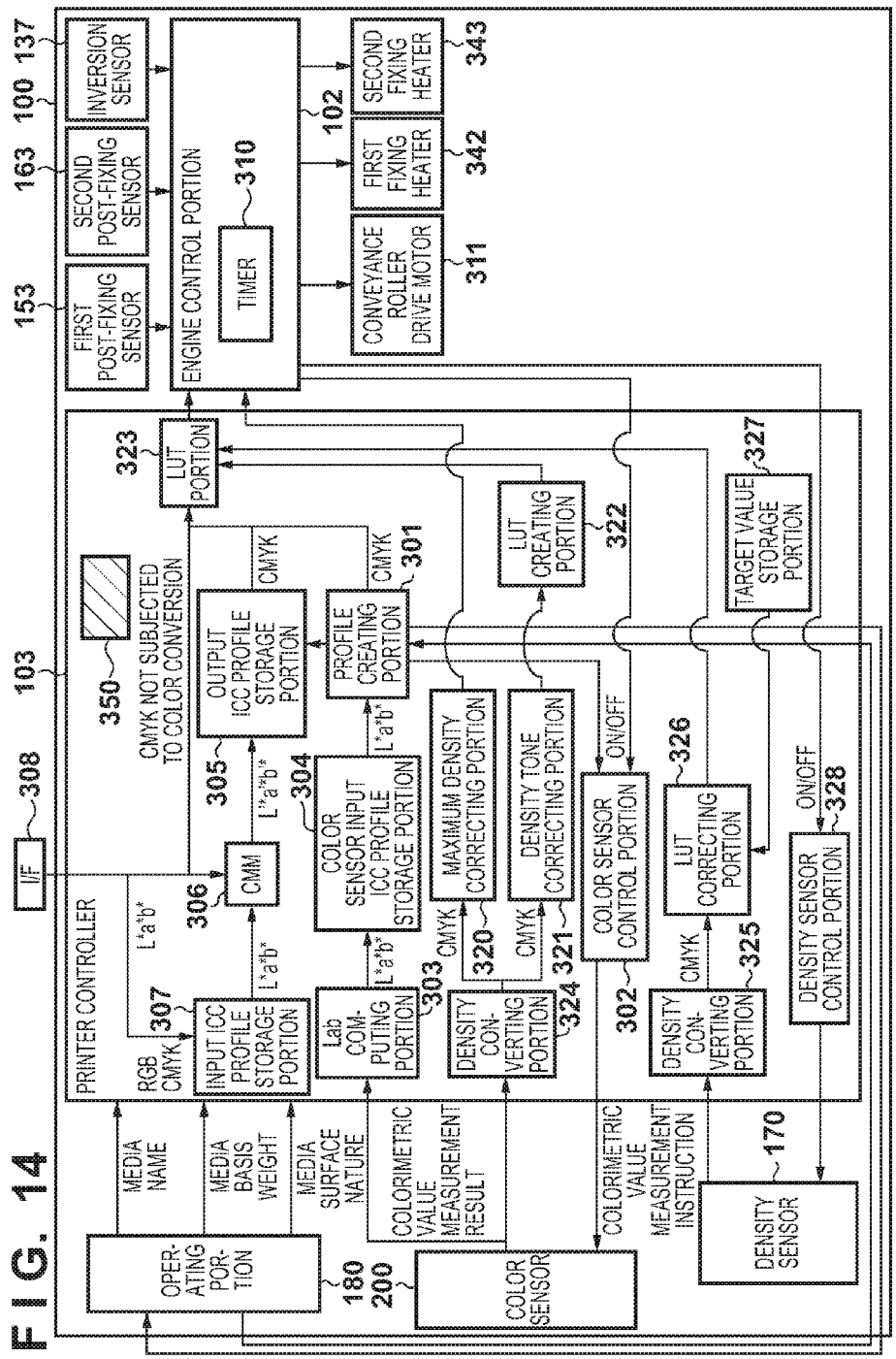
FIG. 14 is a block diagram showing a system configuration of the image forming apparatus.

FIG. 14 is a block diagram showing the system configuration of the image forming apparatus 100. Initially, the printer controller 103 instructs the engine control portion 102 to output a test chart used in maximum density adjustment. At this time period, a patch image for the maximum density adjustment for YMCK colors is formed on the printing medium 110 with the charging potential, exposure intensity, and developing bias that are set in advance, or set for the last maximum density adjustment. After that, the engine control portion 102 instructs the color sensor control portion 302 to measure a colorimetric value of the patch image.

After the colorimetric value of the patch image is measured by the color sensor 200, the colorimetric value measurement result is transmitted as spectral reflectance data to a density converting portion 324. The density converting portion 324 converts the spectral reflectance data into density data on CMYK, and transmits the converted density data to a maximum density correcting portion 320.

The maximum density correcting portion 320 computes correction amounts for the charging potential, exposure intensity, and developing bias so that the maximum density of an output image is a desired value, and transmits the computed correction amounts to the engine control portion 102. The engine control portion 102 uses the transmitted correction amounts for the charging potential, exposure intensity, and developing bias for the subsequent image forming operations. With the above-described operation, the maximum density of the output image is adjusted.

Tone Adjustment

After the maximum density adjustment processing is finished, the printer controller 103 instructs the engine control portion 102 to form a 16-tone patch image on the printing medium 110. Note that image signals for the 16-tone patch image can be, for example, 00H, 10H, 20H, 30H, 40H, 50H, 60H, 70H, 80H, 90H, A0H, B0H, C0H, D0H, E0H, and FFH.

At this time period, the 16-tone patch image of YMCK colors is formed on the printing medium 110 using the correction amounts for the charging potential, exposure intensity, and developing bias computed for the maximum density adjustment. Upon the 16-tone patch image being formed on the printing medium 110, the engine control portion 102 instructs the color sensor control portion 302 to measure a colorimetric value of the patch image.

After the colorimetric value of the patch image is measured by the color sensor 200, the colorimetric value measurement result is transmitted as spectral reflectance data to the density converting portion 324. The density converting portion 324 converts the spectral reflectance data into density data on CMYK, and transmits the converted density data to the density tone correcting portion 321. The density tone correcting portion 321 computes a correction amount for an exposure amount so as to obtain a desired tonality. Then, an LUT creating portion 322 creates a monochrome tone LUT, and transmits the monochrome tone LUT as a signal value for each of CMYK colors to an LUT portion 323.

Inter-Paper Patch Control

The abovementioned tone adjustment is not performed during a job because it takes time period for control. Therefore, during a job, a patch image is formed during a time period interval between images (between papers) on the intermediate transfer member 106, density change in those patch images is measured, and control for reducing the density change is performed.

In this inter-paper patch control, among the patch images formed at the time period of the abovementioned tone adjustment, a patch image of a specific medium tone density (40H in the present embodiment) is formed on the intermediate transfer member 106, and the density of this patch image is detected by the density sensor 170. The density sensor 170 is driven by a density sensor control portion 328 based on an instruction from the engine control portion 102. An output signal of the density sensor 170 is transmitted to a density converting portion 325.

The density converting portion 325 converts the output signal from the density sensor 170 into density data on CMYK. The LUT correction portion 326 corrects the monochrome tone LUT set for the LUT portion 323 so that the density data is set to a target value T set for a target value storage portion 327. Desired tone characteristics can be obtained by thus controlling image formation conditions.

Color Characteristics in Thermochromism

Figure 15:
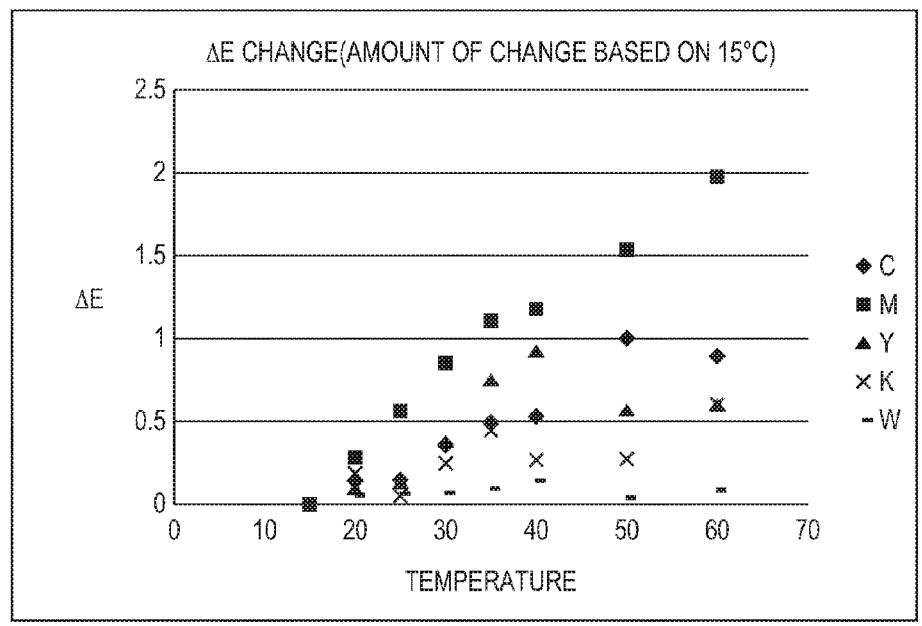
FIG. 15 is a diagram showing a tendency of chromaticity change of each color agent.

Next, thermochromism characteristics of each color will be described. In response to change in the molecular structure that forms the color agent such as toner or ink due to heat, light reflection-absorption characteristics change, and the chromaticity also changes. As a result of verification by experiments, it was found that the tendency of chromaticity change is different among color agents as shown in FIG. 15. The horizontal axis in this diagram indicates the temperature of the patch image, and the vertical axis indicates the chromaticity change $\Delta E$ with respect to reference colors at 15° C.

Note that $\Delta E$ can be expressed as a three-dimensional distance of the following equation between two points (L1, a1, b1) and (L2, a2, b2) in the L*a*b* color space defined by CIE.

$$\Delta E = \sqrt{(L1-L2)^2 + (a1-a2)^2 + (b1-b2)^2}$$

In FIG. 15, C is 100% cyan, M is 100% magenta, Y is 100% yellow, K is 100% black, and W is paper white. As shown in this figure, the chromaticity change of magenta is particularly large. As the temperature of a patch image become higher, the chromaticity change of the patch image becomes larger, and an error is caused in a created ICC profile.

As an index of color matching accuracy and color stability, average $\Delta E$ is defined to be 4.0 in the color matching accuracy standard (IT8.7/4 (ISO12642:1617 patch) [4.2.2]) according to ISO 12647-7. Further, the reproducibility [4.2.3], which is the stability standard defines $\Delta E$ of each patch≤1.5. To fulfill those conditions, the detection accuracy of the color sensor 200 is desirably $\Delta E \leq 1.0$. As shown in FIG. 15, to achieve $\Delta E \leq 1.0$ for all YMCK colors, it is necessary to release heat of the patch image and decrease the temperature thereof to 34° C. or lower.

Relationship Between Temperature and Density Value

Figure 16:
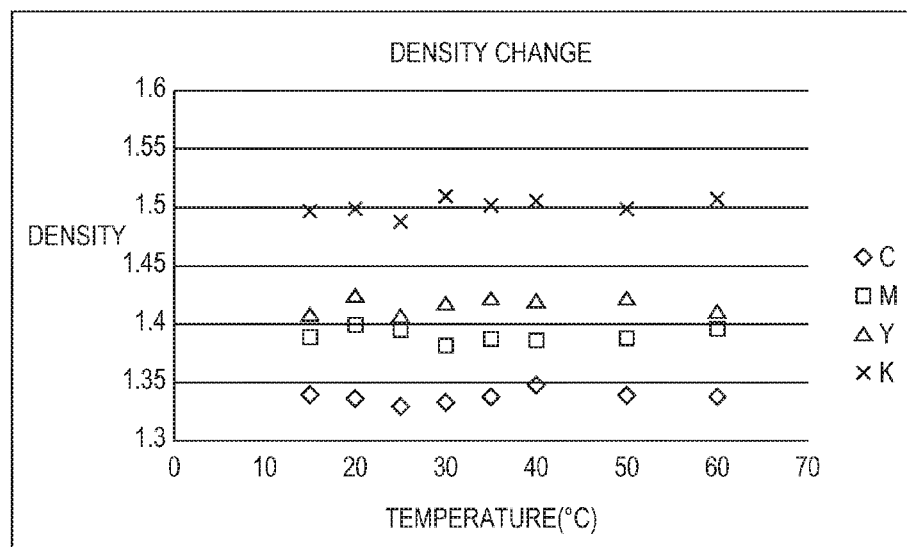
FIG. 16 is a diagram showing a tendency of density change of each color agent.

As described above, a chromaticity value (Lab value) changes with respect to temperature. Meanwhile, as a result of study by the present applicants, it was found that a density value does not substantially change even if temperature changes, and has no correlation with temperature. This result is shown in FIG. 16.

The phenomenon in which when temperature changes, a chromaticity value changes but a density value does not change can be explained from the area where spectral reflectance changes, and difference in methods for computing the chromaticity value and the density value. This point will be described by taking magenta (M), which has large chromaticity change ΔE with respect to temperature change as an example.

Figure 17A:
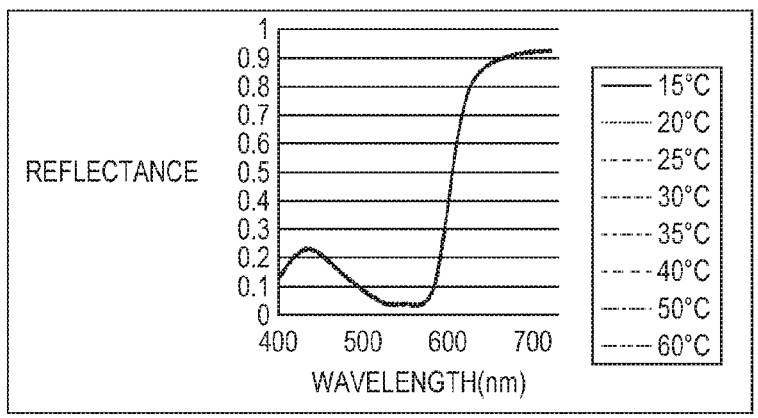
FIGS. 17A to 17C are diagrams showing spectral reflectance data at each temperature at the time period when a colorimetric value of a magenta patch image is measured by a color sensor.
Figure 17B:
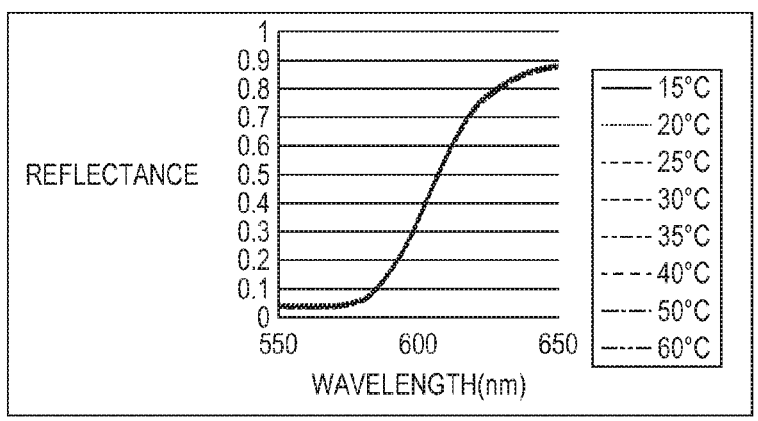
Figure 17C:
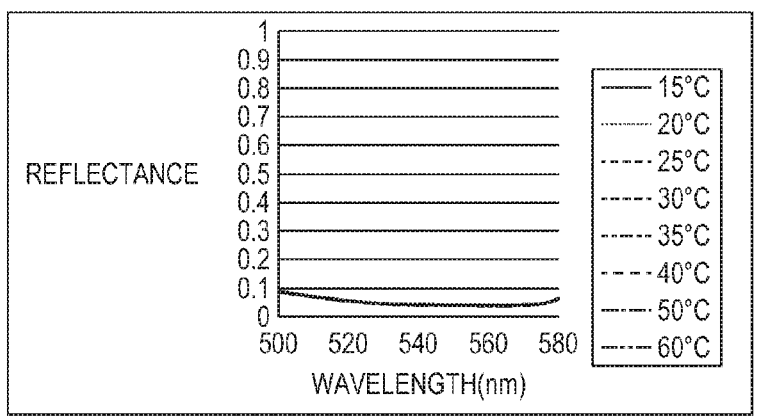

FIG. 17 are spectral reflectance data at each temperature obtained by measuring a colorimetric value of a magenta patch image with the color sensor 200. FIG. 17A shows an entire wavelength area of 400 to 700 nm, FIG. 17B is an enlarged graph showing a wavelength area of 550 to 650 nm, and FIG. 17C is an enlarged graph showing a wavelength area of 500 to 580 nm.

As shown in FIG. 15, if the patch image temperature changes in the range from 15 to 60° C., the chromaticity change ΔE of magenta is about 2.0, and this chromaticity change ΔE is caused because the spectral reflectance changes. It is difficult to understand the change in the spectral reflectance in FIG. 17A, but it can be found in FIG. 17B that enlarges the wavelength area of 550 to 650 nm that the spectral reflectance changes due to the temperature change of the patch image. This is because the Lab computing portion 303 computes the chromaticity using the spectral reflectance in the entire wavelength area, and therefore the chromaticity value changes due to the change in the spectral reflectance.

Figure 18A:
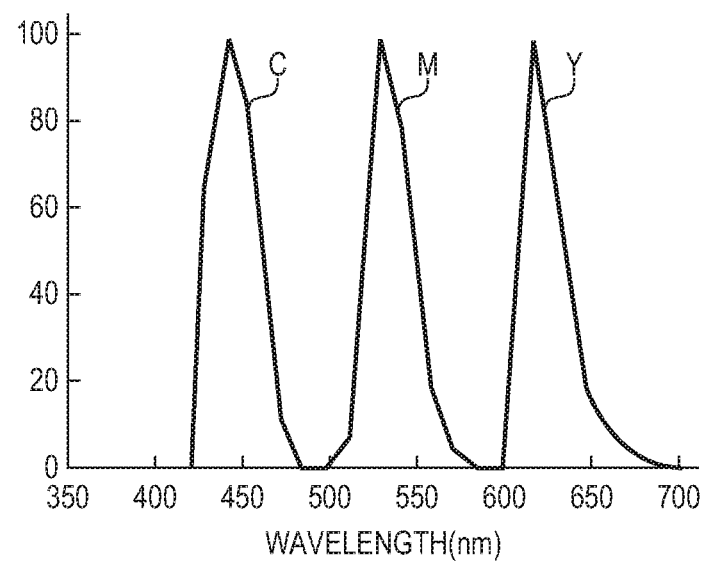
FIGS. 18A and 18B are diagrams showing filter sensitivity properties used in density computation processing.
Figure 18B:
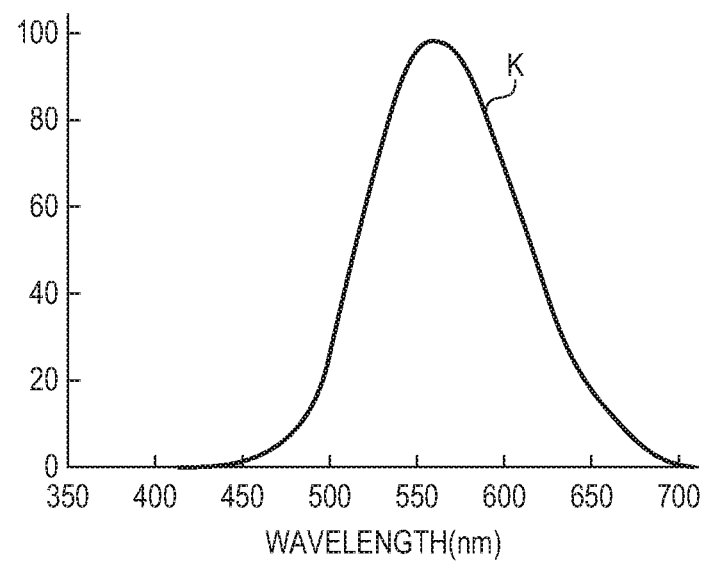

Meanwhile, as shown in FIG. 16, even when the patch image temperature changes in the range from 15 to 60° C., the density does not substantially change. This is because the density converting portion 324 computes the density using the spectral reflectance in a specific wavelength area. Specifically, with respect to cyan, magenta, and yellow, the density converting portion 324 converts spectral reflectance data into density data using the filter shown in FIG. 18A. Further, with respect to black, the density converting portion 324 converts spectral reflectance data into density data with visual spectral characteristics as shown in FIG. 18B.

It can be understood that there is almost no change in the spectral reflectance in the wavelength area shown in FIG. 17C. The area in FIG. 17C is an area having green sensitivity characteristics in the wavelength area indicated by the horizontal axis in FIG. 18A, and the density value of magenta is computed using the sensitivity characteristics of green, which is an opposite color of magenta. Accordingly, there is almost no change in the spectral reflectance even though temperature changes in this area, and therefore, the density value also does not substantially change either.

As described above, the patch image chromaticity changes due to temperature change, while the patch image density does not substantially change due to temperature change. Therefore, in the present embodiment, the colorimetric value measurement is performed by the color sensor 200 at the time period of multicolor correction (at the time period of ICC profile creation) after releasing heat of the printing medium 110 heated by the fixing device. Meanwhile, at the time period of the maximum density adjustment and the tone adjustment, colorimetric value measurement is performed by the color sensor 200 without releasing heat of the printing medium 110.

Thermochromism Handling Technique

Figure 19:
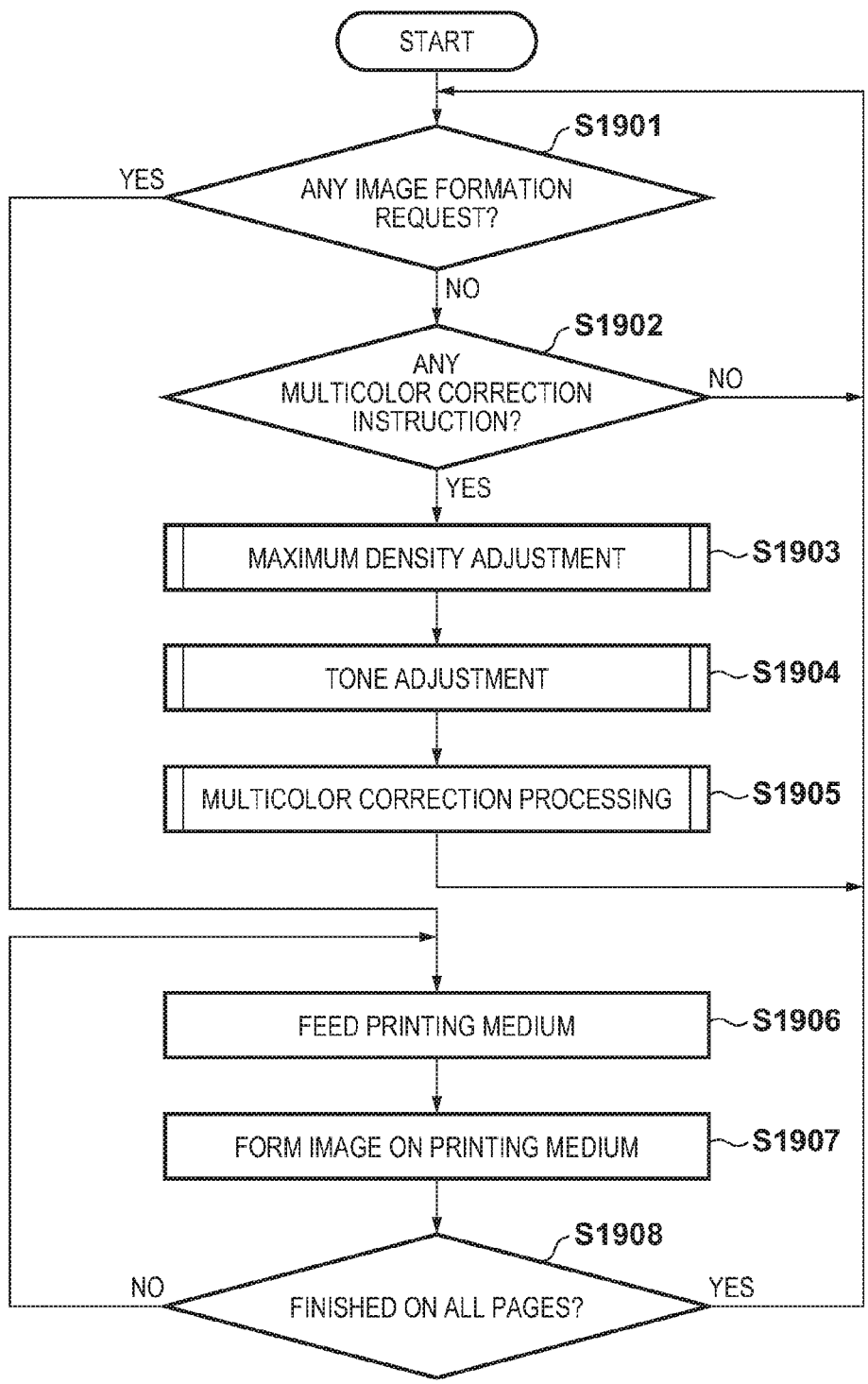
FIG. 19 is a flowchart showing an operation of the image forming apparatus.

FIG. 19 is a flowchart showing an operation in the image forming apparatus 100. This flowchart is executed by the printer controller 103. Initially, in step S1901, the printer controller 103 determines whether or not an image formation request has been given by the operating portion 180, and whether or not an image formation request has been given by the host computer via the I/F 308.

Figure 21:
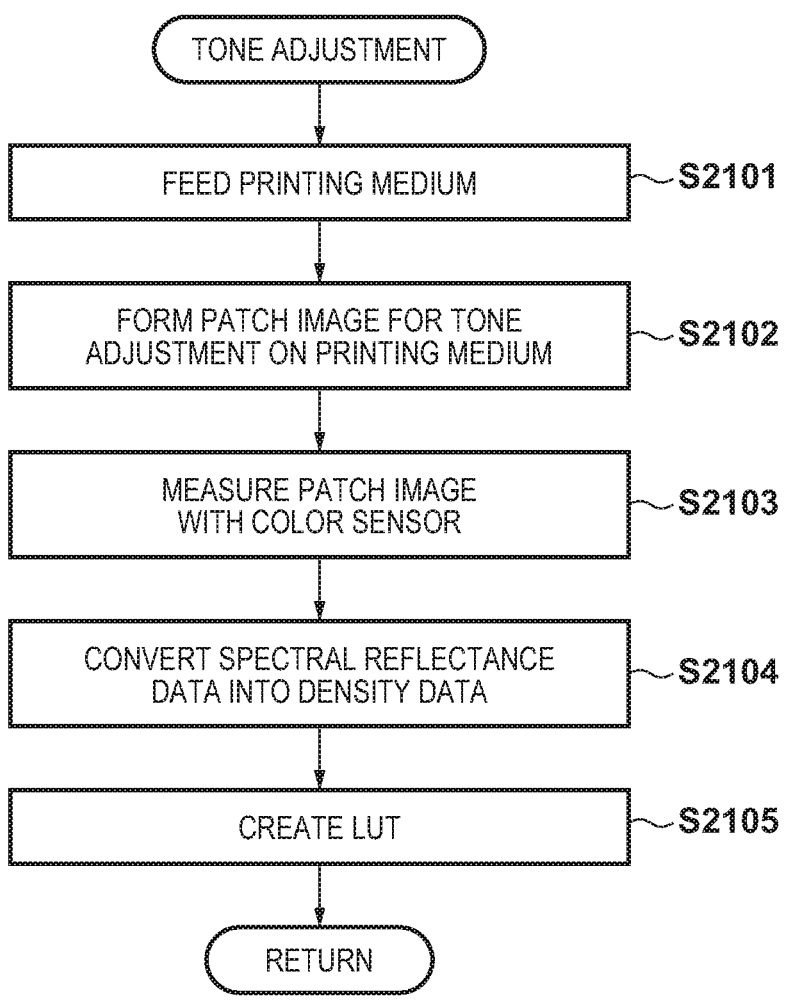
FIG. 21 is a flowchart showing an operation for tone adjustment.
Figure 22:
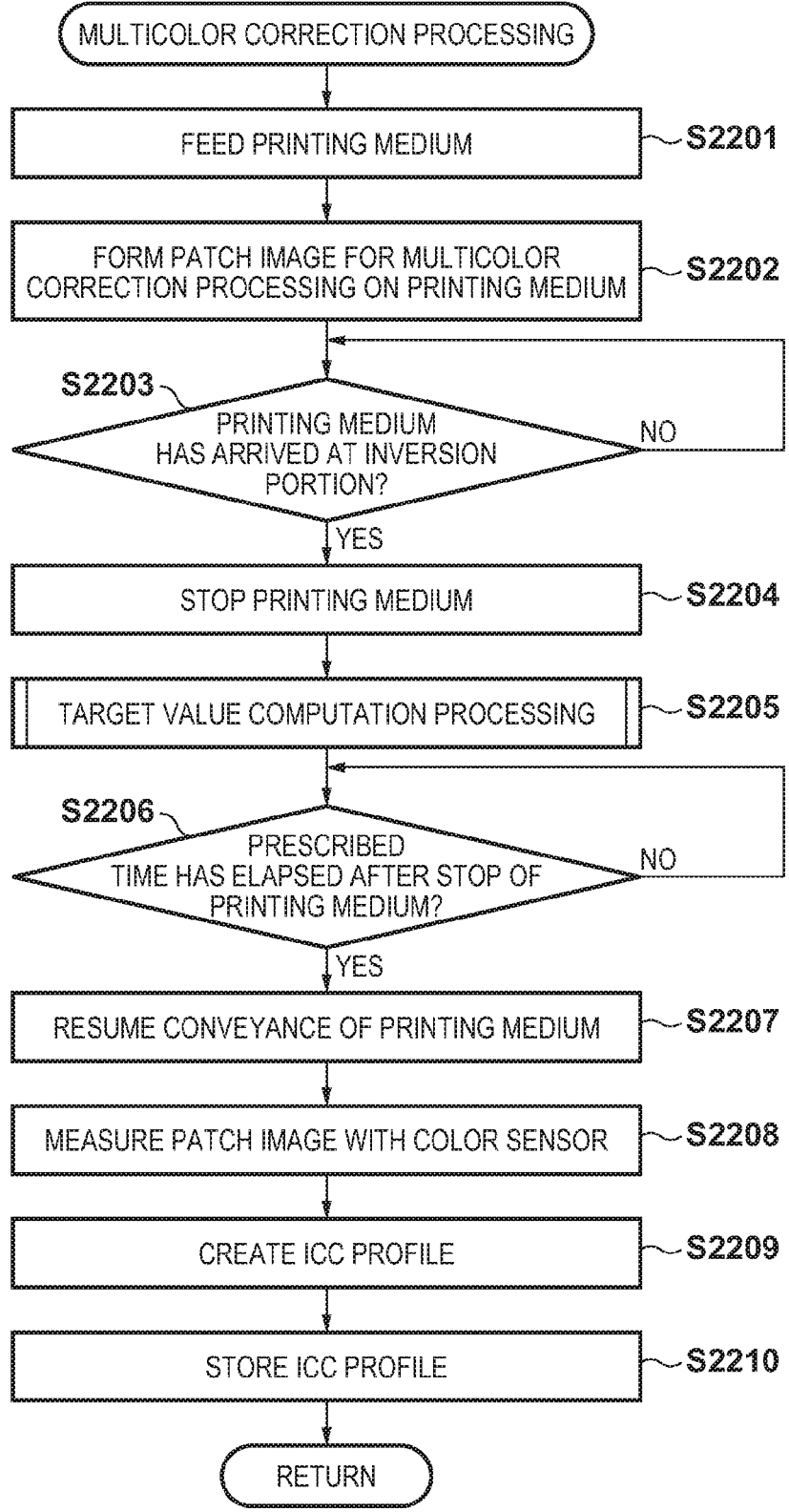
FIG. 22 is a flowchart showing an operation for multicolor correction processing.

If no image formation request has been given, in step S1902 the printer controller 103 determines whether or not a multicolor correction instruction has been given by the operating portion 180. If a multicolor correction instruction has been given, in step S1903 the maximum density adjustment, which will be described later in FIG. 20, is performed, and in step S1904 the tone adjustment, which will be described later in FIG. 21, is performed. After that, in step S1905 multicolor correction processing, which will be described later in FIG. 22, is performed. If, in step S1902, no multicolor correction instruction has been given, the processing returns to the abovementioned step S1901. The maximum density adjustment and the tone adjustment are thus performed before the multicolor correction processing is performed in order to perform the multicolor correction processing with accuracy.

If, in step S1901, it is determined that there is an image formation request, in step S1906 the printer controller 103 causes the printing medium 110 to be fed from the container 113, and forms, in step S1907, a toner image on the printing medium 110. Then, in step S1908 the printer controller 103 determines whether or not image formation on all pages is finished. If image formation on all pages is finished, the processing returns to step S1901, and if not, the processing returns to step S1906 and image formation on the next page is performed. Note that every time period image formation is performed for a prescribed number of pages, the abovementioned inter-page patch control is performed to stabilize the density.

FIG. 20 is a flowchart showing an operation for the maximum density adjustment. This flowchart is executed by the printer controller 103. Note that the control of the image forming apparatus 100 is performed by the engine control portion 102 in response to an instruction from the printer controller 103.

Initially, in step S2001, the printer controller 103 causes the printing medium 110 to be fed from the container 113, and forms, in step S2002, a patch image for the maximum density adjustment of YMCK colors on the printing medium 110. Next, in step S2003, upon the printing medium 110 arriving at the color sensor 200, the printer controller 103 causes the color sensor 200 to measure the patch image.

Then, in step S2004, the printer controller 103 causes the density converting portion 324 to convert the spectral reflectance data output by the color sensor 200 into density data on CMYK. After that, in step S2005 the printer controller 103 computes correction amounts for the charging potential, exposure intensity, and developing bias based on the converted density data. The correction amounts computed here are stored in the storage portion 350 for use.

FIG. 21 is a flowchart showing an operation for the tone adjustment. This flowchart is executed by the printer controller 103. Note that the control of the image forming apparatus 100 is performed by the engine control portion 102 in response to an instruction from the printer controller 103.

Initially, in step S2101 the printer controller 103 causes the printing medium 110 to be fed from the container 113. In step S2102, a patch image (16 tones) for the tone adjustment of YMCK colors is formed on the printing medium 110. Next, upon the printing medium 110 arriving at the color sensor 200, in step S2103 the printer controller 103 causes the color sensor 200 to measure the patch image.

Then, in step S2104, the printer controller 103 causes the density converting portion 324 to convert the spectral reflectance data output by the color sensor 200 into density data on CMYK. After that, in step S2105 the printer controller 103 creates an LUT for correcting tone based on the converted density data. The LUT computed here is set for the LUT portion 323 for use.

FIG. 22 is a flowchart showing an operation for the multicolor correction processing. This flowchart is executed by the printer controller 103. Note that the control of the image forming apparatus 100 is performed by the engine control portion 102 in response to an instruction from the printer controller 103.

Initially, in step S2201 the printer controller 103 causes the printing medium 110 to be fed from the container 113. In step S2202, a patch image for the multicolor correction processing is formed on the printing medium 110. Next, in step S2203 the printer controller 103 waits until the arrival of the printing medium 110 at the inversion portion 136 is detected based on detection of the trailing end of the printing medium 110 by the inversion sensor 137. In step S2204, upon the printing medium 110 arriving at the inversion portion 136, the printer controller 103 controls the conveyance roller drive motor 311 so as to stop conveyance of the printing medium 110.

Upon conveyance of printing medium 110 being stopped in step S2204, in step S2205 the printer controller 103 performs target value computation processing, which will be described later using FIG. 23. This target value computation processing is processing for computing the target value T used in the abovementioned inter-paper patch control. At this point, both the maximum density adjustment and the tone adjustment have been performed, and therefore, the output image density has already been adjusted to the desired density. Accordingly, it is necessary at this point to form a patch image on the intermediate transfer member 106 and set the density value of this patch image to the target value T in the inter-paper patch control.

After the target value computation processing is finished, in step S2206 the printer controller 103 determines whether or not a prescribed time period (40 seconds in the present embodiment) has elapsed after conveyance of the printing medium 110 is stopped in step S2204. The determination of whether or not the prescribed time period has elapsed is made based on a count value of the timer that is started after conveyance of the printing medium 110 is stopped. By thus stopping conveyance of the printing medium 110 for the prescribed time period, heat of the patch image on the printing medium 110 is released. Thus the chromaticity change due to influence of thermochromism can be reduced.

Note that as shown in FIG. 15, to achieve ΔE of all YMCK colors≤1.0, it is necessary to release heat of the patch image and decrease the temperature thereof to 34° C. or lower. The time period necessary for releasing heat here is set to 40 seconds in the present embodiment. By stopping the printing medium 110 for 40 seconds, heat can be released so that the temperature is decreased to 34° C. or lower even when both a first fixing heater 342 provided to the first fixing device 150 and a second fixing heater 343 provided to the second fixing device 160 are used.

After 40 seconds of the stopping time period has elapsed, in step S2207 the printer controller 103 controls the conveyance roller drive motor 311 so as to resume conveyance of the printing medium 110. At this time period, the printer controller 103 reverses the conveyance direction of the printing medium 110, and conveys the printing medium 110 toward the color sensor 200.

Upon the printing medium 110 arriving at the color sensor 200, in step S2208 the printer controller 103 causes the color sensor 200 to measure the patch image. Then, the printer controller 103 computes chromaticity data (L*a*b*) with the Lab computing portion 303 from the spectral reflectance data output by the color sensor 200. In step S2209, the printer controller 103 creates an ICC profile by the abovementioned processing based on the chromaticity data (L*a*b*). In step S2210, the ICC profile is stored in the output ICC profile storage portion 305.

Figure 23:
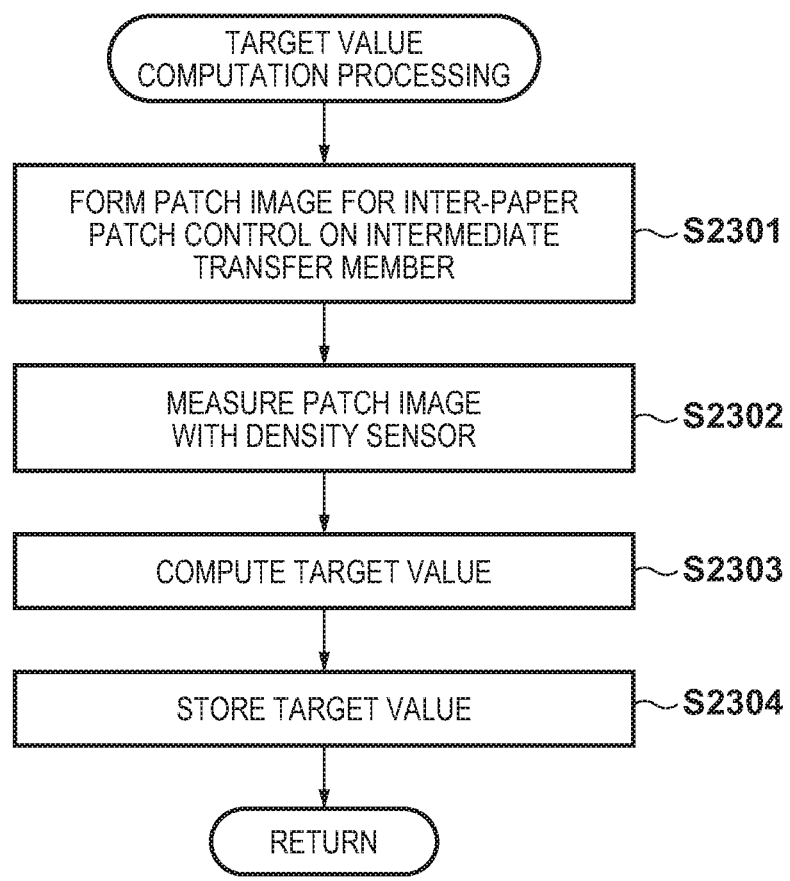
FIG. 23 is a flowchart showing an operation for target value computation processing.

FIG. 23 is a flowchart showing an operation for the target value computation processing. This flowchart is executed by the printer controller 103. Note that the control of the image forming apparatus 100 is performed by the engine control portion 102 in response to an instruction from the printer controller 103. The target value computation processing is, as shown in FIG. 22, performed while conveyance of the printing medium 110 is stopped and its heat is released.

Initially, in step S2301 the printer controller 103 forms a patch image for the inter-paper control on the intermediate transfer member 106. The signal value of the patch image formed here is 40H, as mentioned above. Next, in step S2302 the printer controller 103 measures density of the patch image using the density sensor 170.

In step S2303, the printer controller 103 computes the patch image density as the target value T used in the inter-paper patch control. In step S2304, the target value T is stored in the target value storage portion 327. That is, in this flowchart, the output signal from the density sensor 170 that detects the patch image is converted into the density data on YMCK, and this density data is stored as the target value T in the target value storage portion 327.

Note that in the inter-paper patch control, the printer controller 103 compares the measured value of the patch image formed on the intermediate transfer member 106 during successive jobs with the target value T stored in the target value storage portion 327 in step S2304, and corrects the LUT.

Description of Effect

The chromaticity change due to influence of thermochromism is reduced by performing the above-described control, and it is thus possible to detect the patch image chromaticity with accuracy, and improve productivity. FIG. 24 shows comparison of total time period taken for performing all of the maximum density adjustment, the tone adjustment, the multicolor correction processing, and the target value computation processing in the present embodiment and in a comparative example. Note that in the comparative example, the target value computation processing is performed after the multicolor correction processing is finished.

In the target value computation processing for the inter-paper patch control, a patch image of an image signal 40H was formed on the intermediate transfer member 106, and the density of this patch image was measured, which took about 30 seconds. Note that in order to further improve the accuracy, not only the target value T of the patch image of the image signal 40H but also target values of other image signals may be additionally used to form and measure the patch image, and in that case, the target value computation processing takes longer than 30 seconds.

As is understood from FIG. 24, compared with the comparative example, the present embodiment is able to shorten 30 seconds in total, that is, 20% of the time period by performing the target value computation processing within the multicolor correction processing.

As described above, in the present embodiment, the target value computation processing is performed during execution of the multicolor correction processing after the printing medium 110 passes through the fixing device until the colorimetric value measurement is performed by the color sensor 200. Particularly, in the present embodiment, the processing for computing the target value used in the inter-paper patch control is performed while conveyance of the printing medium 110 is stopped and heat of the patch image is released. Thus in the present embodiment, the chromaticity change due to influence of thermochromism is reduced, and it is possible to detect the chromaticity of a measurement image with accuracy, and improve productivity.

Note that in the above description, heat of the printing medium 110 is released by temporarily stopping the printing medium 110 after the printing medium 110 passes through the fixing device until the colorimetric value measurement is performed by the color sensor 200. Meanwhile, the timing of the colorimetric value measurement may be delayed by reducing the conveyance speed of the printing medium 110, instead of temporarily stopping the printing medium 110.

Fourth Embodiment

Thermochromism Handling Technique

FIG. 25 is a flowchart showing an operation in the image forming apparatus 100. This flowchart is executed by the printer controller 103. Initially, in step S2501, the printer controller 103 determines whether or not an image formation request has been given by the operating portion 180, and whether or not an image formation request has been given by the host computer via the I/F 308.

Figure 26:
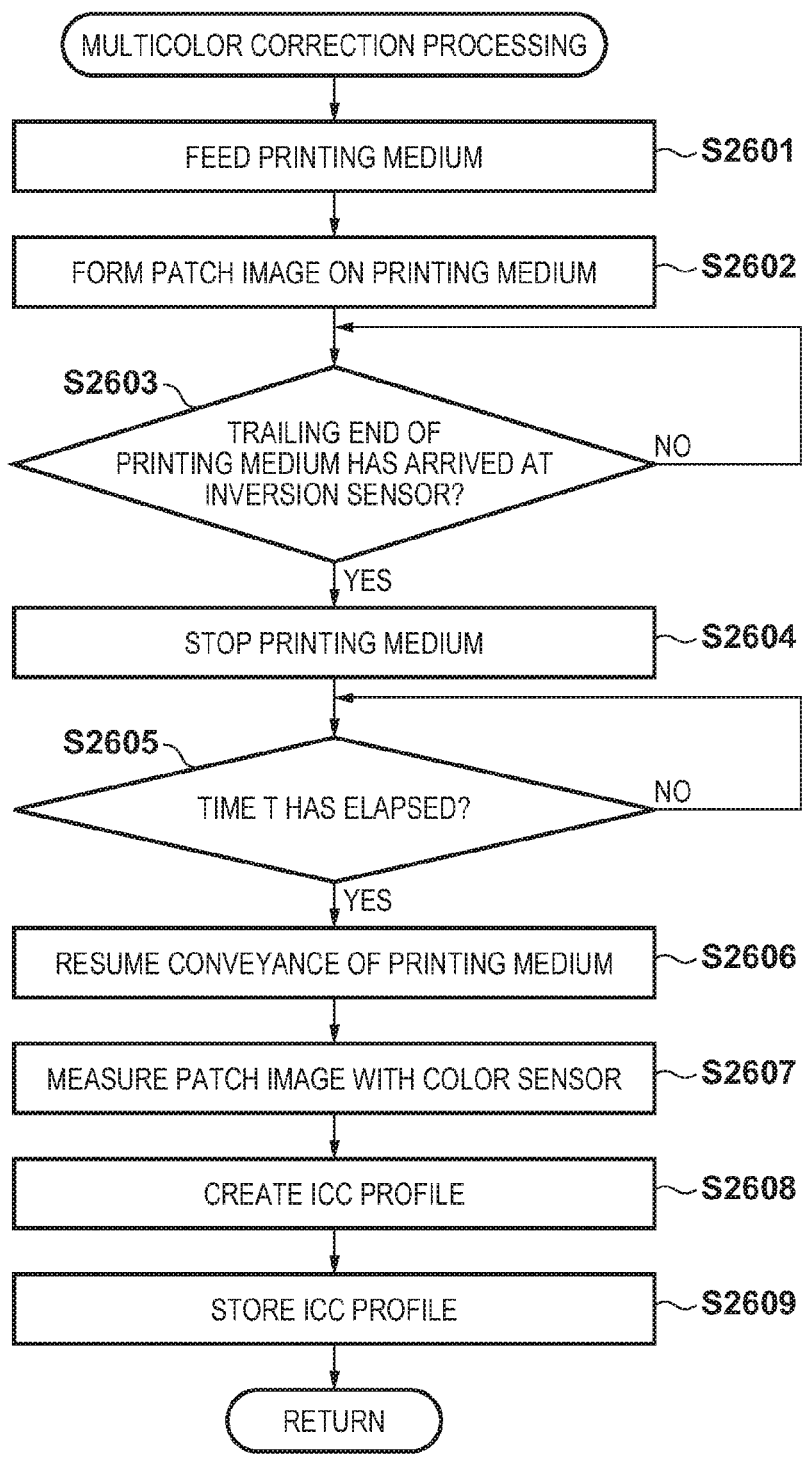
FIG. 26 is a flowchart showing multicolor correction processing.

If no image formation request has been given, in step S2502 the printer controller 103 determines whether or not a multicolor correction instruction has been given by the operating portion 180. In step S2503, if a multicolor correction instruction has been given, the multicolor correction processing, which will be described later in FIG. 26, is performed. If no multicolor correction instruction has been given, the processing returns to the abovementioned step S2501.

If, in step S2501, it is determined that an image formation request has been given, in step S2504 the printer controller 103 causes the printing medium 110 to be fed from the container 113. In step S2505, a toner image is formed on the printing medium 110. Then, in step S2506 the printer controller 103 determines whether or not image formation on all pages is finished. If image formation on all pages is finished, the processing returns to step S2501, and if not, the processing returns to step S2504 and image formation on the next page is performed.

FIG. 26 is a flowchart showing an operation for the multicolor correction processing. This flowchart is executed by the printer controller 103. Note that the control of the image forming apparatus 100 is performed by the engine control portion 102 in response to an instruction from the printer controller 103.

Initially, in step S2601 the printer controller 103 causes the printing medium 110 to be fed from the container 113. In step S2602, a patch image is formed on the printing medium 110. Next, in step S2603, the printer controller 103 waits until the trailing end of the printing medium 110 is detected by the inversion sensor 137.

Upon the trailing end of the printing medium 110 being detected by the inversion sensor 137, in step S2604 the printer controller 103 controls the conveyance roller drive motor 311 so as to stop conveyance of the printing medium 110. Next, in step S2605, the printer controller 103 waits until time period T elapses after conveyance of the printing medium 110 is stopped. Thus, heat of the patch image on the printing medium 110 is released while the printing medium 110 is caused to temporarily stop at the inversion portion 136. Thus the chromaticity change due to influence of thermochromism can be reduced. Note that the time period T is set in accordance with settings of the basis weight, surface nature, and glossiness of the printing medium 110. This point will be described later in detail.

After the stopping time period T elapses, in step S2606 the printer controller 103 controls the conveyance roller drive motor 311 so as to resume conveyance of the printing medium 110. At this time period, the printer controller 103 reverses the conveyance direction of the printing medium 110, and conveys the printing medium 110 toward the color sensor 200.

Upon the printing medium 110 arriving at the color sensor 200, in step S2607 the printer controller 103 causes the color sensor 200 to measure the patch image. After that, in step S2608, the printer controller 103 creates an ICC profile with the abovementioned processing based on the result of colorimetric value measurement by the color sensor 200. In step S2609, the ICC profile is stored in the output ICC profile storage portion 305.

Setting of Heat Releasing Time Period

The image forming apparatus 100 has seven fixing modes shown in FIG. 28. The reason for thus preparing several modes is because fixing conditions need to be changed in accordance with settings of the basis weight, surface nature, and glossiness of the printing medium 110.

Figure 27A:
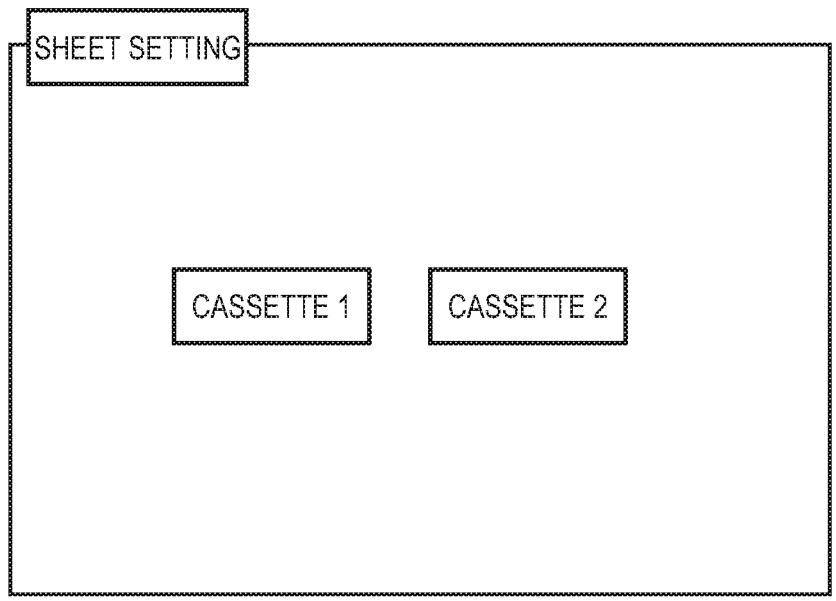
FIGS. 27A and 27B are diagrams illustrating printing medium setting screens.
Figure 27B:
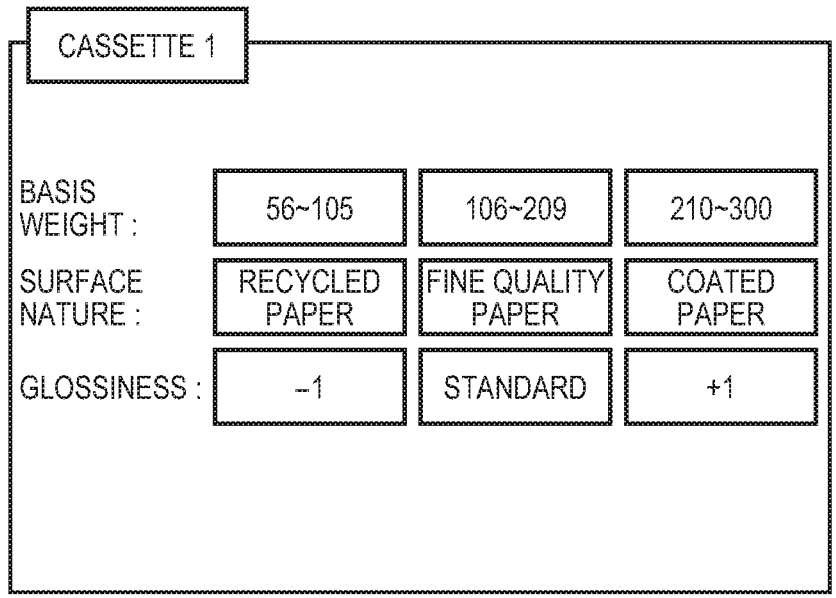

FIG. 27 are diagrams illustrating printing medium setting screens. The screens shown in FIGS. 27A and 27B are displayed on a touch panel display provided to the operating portion 180. A user selects, from the screen of FIG. 27A, which cassette in the container 113 the user configures the settings for. For example, upon a cassette 1 being selected, the screen of FIG. 27B appears, and setting of the basis weight, surface nature, and glossiness of the printing medium 110 contained in the cassette 1 is enabled.

Heat quantity necessary for fixing needs to be changed in accordance with the settings of the basis weight, surface nature, and glossiness of the printing medium 110. This is because the heat quantity absorbed by the printing medium 110 when the toner image formed on the printing medium 110 is heated and fixed is different depending on the basis weight of the printing medium 110. Further, if a large quantity of heat is applied to paper with course surfaces, such as recycled paper, toner goes deep into paper fiber and quality deteriorates, and handling of such phenomenon is another reason. Moreover, to meet users' demand for the degree of glossiness, it is necessary to prepare several fixing modes.

FIG. 29 shows settings of a fixing mode in the case where the printing medium 110 is recycled paper, FIG. 30 shows settings of a fixing mode in the case where the printing medium 110 is fine quality paper, and FIG. 31 shows setting of a fixing mode in the case where the printing medium 110 is coated paper. The engine control portion 102 controls the first fixing heater 342 provided to the first fixing device 150, and the second fixing heater 343 provided to the second fixing device 160 in accordance with the basis weight, surface nature, and glossiness set by the operating portion 180.

As shown in FIG. 30, for example if the glossiness of the printing medium 110 that is fine quality paper and has a basis weight of 80 g/m2 is changed from "standard" to "−1", the temperature of the first fixing device 150 is changed from 180° C. to 165° C. Also, for example if the glossiness of "+1" is selected for the printing medium that is fine quality paper and has a basis weight of 80 g/m2, the second fixing device 160 as well as the first fixing device 150 are set to be used.

Thus, with different fixing conditions, the temperature of the printing medium 110 at the time period when the colorimetric value measurement is performed by the color sensor 200 differs. Accordingly, the waiting time period T used at the time period when the printing medium 110 is stopped at the inversion portion 136 to release heat in step S2605 in FIG. 26 needs to be set in accordance with the basis weight, surface nature, and glossiness.

When determining the waiting time period T for releasing heat, it is necessary to consider (1) the distance from the fixing device through which the printing medium lastly goes to the inversion portion 136, (2) the fixing temperature, and (3) heat release characteristics of the printing medium 110.

(1) The distance from the second fixing device 160 to the inversion portion 136 is shorter than the distance from the first fixing device 150 to the inversion portion 136. Therefore, heat releasing time period until arrival at the inversion portion 136 of the printing medium 110 that passes through both the first fixing device 150 and the second fixing device 160 is shorter than that of the printing medium 110 that passes through only the first fixing device 150, and therefore the waiting time period T at the inversion portion 136 for the former printing medium 110 is set to be longer.

(2) As the fixing temperature is higher, the printing medium 110 holds a larger quantity of heat. Accordingly, as the fixing temperature is higher, the waiting time period T at the inversion portion 136 needs to be set to be longer.

(3) As the heat release characteristics of the printing medium 110, heat of recycled paper, fine quality paper, and coated paper is easily released in this order. Also, as the basis weight of the printing medium 110 is smaller, heat is more easily released.

In consideration of (1) to (3) above, the present applicants obtained appropriate waiting time periods T by conducting experiments using the image forming apparatus 100. FIG. 32 shows waiting time periods T at the inversion portion 136 in the case where the printing medium 110 is recycled paper, FIG. 33 shows waiting time periods T at the inversion portion 136 in the case where the printing medium 110 is fine quality paper, and FIG. 34 shows waiting time periods T at the inversion portion 136 in the case where the printing medium 110 is coated paper.

As shown in FIGS. 32 to 34, the waiting time period T is changed in accordance with settings of the basis weight, surface nature, and glossiness of the printing medium 110, and start time period of the colorimetric value measurement by the color sensor 200 is changed. It is thus possible to release the heat of the patch image and decrease the temperature thereof to 34° C. by the time period of start of the colorimetric value measurement by the color sensor 200, and achieve $\Delta E \leq 1.0$.

As described above, in the present embodiment, the time period from when the printing medium 110 passes through the fixing device to when the colorimetric value measurement is performed by the color sensor 200 is controlled based on the content of the paper type settings of the printing medium 110. Thus, in the present embodiment, the chromaticity change due to influence of thermochromism is reduced, and the chromaticity of a patch image can be detected with accuracy.

Note that in the present embodiment the waiting time period T of the printing medium 110 at the inversion portion 136 is optimized, but the configuration is not limited thereto as long as the time period from when the printing medium 110 passes through the fixing device to when it arrives at the color sensor 200 can be adjusted. For example, the speed of the printing medium 110 may be decreased, the time period from when the printing medium 110 passes through the fixing device to when it arrives at the color sensor 200 may be adjusted by controlling the decelerating time period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-194414 filed Sep. 6, 2011, Japanese Patent Application No. 2011-226025 filed Oct. 13, 2011, and Japanese Patent Application No. 2011-221233 filed Oct. 5, 2011, which are hereby incorporated by reference herein in their entirety.

The invention claimed is:

1. An image forming apparatus comprising;
   an image forming unit configured to form an image on a printing medium;
   a fixing unit configured to fix the image on the printing medium;
   a conveyance unit configured to convey the printing medium along a conveyance path;
   a color measurement unit configured to measure, downstream of the fixing unit in a conveyance direction of the printing medium, a color of the image;
   an obtaining unit configured to obtain information related to the printing medium; and
   a controller configured to determine, based on the obtained information, a predetermined time for reducing an influence of thermochromism, and control, based on the predetermined time, the conveyance of the printing medium until the color measurement unit measures the color of the image formed on the printing medium after the printing medium passes the fixing unit.

2. The image forming apparatus according to claim 1, wherein
   the obtained information corresponds to a type of the printing medium.

3. The image forming apparatus according to claim 1, wherein
   the image forming unit includes a reverse mechanism configured to reverse the conveyance direction of the printing medium, and
   the color measurement unit measures the image formed on the printing medium of which the conveyance direction is reversed.

4. The image forming apparatus according to claim 1, wherein
   the predetermined time is a time period in which a temperature of the printing medium that arrived at the color measurement unit decreases to 45° C. or lower.

5. The image forming apparatus according to claim 1, wherein
   the obtained information indicates a thickness, a basis weight, or a surface of the printing medium.

6. The image forming apparatus according to claim 1, wherein
   the controller stops the conveyance of the printing medium based on the predetermined time after the printing medium passes the fixing unit.

7. The image forming apparatus according to claim 1, wherein the controller decreases a conveyance speed of the printing medium based on the predetermined time after the printing medium passes the fixing unit.

* * * * *